US011168529B2

(12) United States Patent
Gromes, Sr.

(10) Patent No.: US 11,168,529 B2
(45) Date of Patent: Nov. 9, 2021

(54) METHOD FOR A CENTERING DEVICE FOR A UTILITY TOOL IN A PIPE OR TUBE

(71) Applicant: Terydon, Inc., Navarre, OH (US)

(72) Inventor: Terry D. Gromes, Sr., Navarre, OH (US)

(73) Assignee: Terydon, Inc., Navare, OH (US)

( * ) Notice: Subject to any disclaimer, the term of this patent is extended or adjusted under 35 U.S.C. 154(b) by 0 days.

(21) Appl. No.: 16/861,419

(22) Filed: Apr. 29, 2020

(65) Prior Publication Data
US 2020/0256147 A1 Aug. 13, 2020

Related U.S. Application Data

(63) Continuation of application No. 15/813,849, filed on Nov. 15, 2017, now Pat. No. 10,697,263.

(51) Int. Cl.
E21B 29/00 (2006.01)
B24C 1/04 (2006.01)
B23D 21/14 (2006.01)
B24C 3/32 (2006.01)
B23G 1/52 (2006.01)

(52) U.S. Cl.
CPC ............ *E21B 29/002* (2013.01); *B23D 21/14* (2013.01); *B24C 1/045* (2013.01); *B24C 3/325* (2013.01); *B23G 1/52* (2013.01)

(58) Field of Classification Search
CPC .......... G01B 7/02; B24C 1/045; B24C 3/325; B23D 21/14; B23G 1/52; E21B 29/002
USPC .......................................................... 33/520
See application file for complete search history.

(56) References Cited

U.S. PATENT DOCUMENTS

| 2,265,082 A | 12/1941 | O'Neill |
| 2,315,496 A | 4/1943 | Boynton |
| 3,066,735 A | 12/1962 | Zingg |
| 3,081,828 A | 3/1963 | Quick |
| 3,145,776 A | 8/1964 | Pittman |
| 3,338,305 A | 8/1967 | Pittman et al. |
| 3,393,736 A | 7/1968 | Goodwin |
| 3,585,699 A | 6/1971 | Shuttle |
| 4,047,569 A | 9/1977 | Tagirov et al. |

(Continued)

FOREIGN PATENT DOCUMENTS

| CA | 2587483 | 5/2006 |
| CA | 2757675 | 3/2012 |
| GB | 2288350 | 10/1995 |

OTHER PUBLICATIONS

Peter S. Menell et al., "Patent Claim Construction: A Modern Synthesis Structured Framework," 25 Berkeley Tech. L.J. 711, Jan. 1, 2010, 121 pages.

*Primary Examiner* — Yaritza Guadalupe-McCall
(74) *Attorney, Agent, or Firm* — Sand, Sebolt & Wernow Co., LPA

(57) ABSTRACT

A method for centering device on a cutting device using an ultrahigh pressure (UHP) hose carrying UHP fluid that is designed to be inserted into a pipe or tube and cut the same from the inside out. In one example, the cutting device is for insertion into a wellbore for cutting the casing of the wellbore from within the wellbore with a revolvable UHP hose. The cutting head which effectuates the cut may be centered by the centering device that is generally conical in shape such that a portion of the centering device remains exterior to the pipe or tube as the UHP revolves during the cutting action.

23 Claims, 30 Drawing Sheets

(56) References Cited

U.S. PATENT DOCUMENTS

| | | |
|---|---|---|
| 4,346,761 A | 8/1982 | Skinner et al. |
| 4,598,769 A | 7/1986 | Robertson |
| 4,619,556 A | 10/1986 | Parra |
| 4,648,215 A | 3/1987 | Hashish et al. |
| 4,768,899 A | 9/1988 | Dysarz |
| 5,001,870 A | 3/1991 | Yokota et al. |
| 5,010,694 A | 4/1991 | Agbede |
| 5,065,551 A | 11/1991 | Fraser |
| 5,144,766 A | 9/1992 | Hashish et al. |
| 5,381,631 A | 1/1995 | Raghavan et al. |
| 5,435,394 A | 7/1995 | Robertson |
| 5,685,078 A | 11/1997 | Obst et al. |
| 5,695,010 A | 12/1997 | Hongo |
| 6,138,777 A | 10/2000 | Fraim et al. |
| 6,155,343 A | 12/2000 | Nazzal et al. |
| 6,189,629 B1 | 2/2001 | McLeod et al. |
| 6,283,230 B1 | 9/2001 | Peters |
| 6,439,313 B1 | 8/2002 | Thomeer et al. |
| 6,564,868 B1 | 5/2003 | Ferguson et al. |
| 7,178,598 B2 | 2/2007 | Lund et al. |
| 7,306,031 B2 | 12/2007 | Wright et al. |
| 7,527,092 B2 | 5/2009 | McAfee |
| 7,540,327 B2 | 6/2009 | Billingham |
| 7,546,876 B2 | 6/2009 | McAfee |
| 7,922,566 B2 | 4/2011 | Chacko et al. |
| 8,448,880 B2 | 5/2013 | Hashish et al. |
| 8,820,396 B2 * | 9/2014 | Cumby ............... E21B 29/005 166/55.6 |
| 8,833,444 B2 | 9/2014 | McAfee et al. |
| 9,453,384 B2 | 9/2016 | Von Wirth et al. |
| 9,464,399 B2 | 10/2016 | Melancon |
| 10,525,569 B2 * | 1/2020 | Linde ............... E21B 29/00 |
| 10,697,263 B2 * | 6/2020 | Gromes, Sr. ........... E21B 29/002 |
| 10,781,652 B2 * | 9/2020 | Gromes, Sr. ........... E21B 43/114 |
| 2004/0089450 A1 | 5/2004 | Slade et al. |
| 2005/0173123 A1 | 8/2005 | Lund et al. |
| 2007/0114066 A1 | 5/2007 | Hall et al. |
| 2007/0175636 A1 | 8/2007 | McAfee |
| 2008/0066913 A1 | 3/2008 | Lynde et al. |
| 2008/0271892 A1 | 11/2008 | Lynde et al. |
| 2008/0277118 A1 * | 11/2008 | McAfee ............... E21B 29/06 166/298 |
| 2013/0112393 A1 * | 5/2013 | Cumby ............... E21B 29/005 166/55 |
| 2014/0157963 A1 * | 6/2014 | Von Wirth ........... E21B 29/002 83/27 |
| 2015/0211202 A1 | 7/2015 | Melancon |
| 2015/0285021 A1 | 10/2015 | Sides, III et al. |
| 2019/0145209 A1 | 5/2019 | Gromes et al. |
| 2019/0145210 A1 | 5/2019 | Gromes et al. |
| 2020/0256147 A1 * | 8/2020 | Gromes, Sr. ........... B24C 1/045 |

\* cited by examiner

METHOD FOR A CENTERING DEVICE FOR A UTILITY TOOL IN A PIPE OR TUBE

CROSS REFERENCE TO RELATED APPLICATIONS

This application is a continuation of U.S. application Ser. No. 15/813,849, filed on Nov. 15, 2017; the disclosure of which is incorporated herein by reference.

BACKGROUND

Technical Field

The present invention relates to ultra-high pressure (UHP) cutting devices, and specifically to UHP cutting devices for sublevel use for cutting pipe casings and liners for example in the dismantling of existing oil, gas and/or utility well bores or lines.

Background Information

The abandonment of non-producing or uneconomic oil or gas wells presents a number of safety and environment issues. Typically, in the abandonment process, all production and surface wellbore casings along with conductor barrels and cement liners have to be removed to a depth of two meters below the surface.

A previous method for such removal required a large scale excavation of soil from around the existing wellbore. In order to do this, line location companies needed to be brought in to determine locations of any existing oil, gas and/or utility lines. Proper safety practices typically require that a very large area be excavated to allow a welder and an assistant to descend into the area to the required depth to cut the existing steel casings and cement liners. This cutting of the casing is done using a cutting torch.

Typically, the casing is cut horizontally and then vertically to remove the outer layer. Any cement present then has to be removed using either a jackhammer or sledge hammer. This allows access to secondary steel casings that are cut using the cutting torch again.

Throughout this process, a source of ignition, the cutting torch, is being used in an area wherein there is a possibility for the presence of explosive or flammable gases or liquids. This type of work environment may be referred to as a hot work area. A significant safety threat is inherent for the personnel in a hot work area and is further exasperated through the use of a cutting torch or any other heat based cutting tool.

One previous attempt at overcoming this issue was to provide a different type of tool consisting of a rotatable tube or hose that would be lowered inside the casing and then rotated about the central longitudinal axis.

More particularly, U.S. Pat. No. 8,820,396 provides an ultra-high pressure (UHP) cutting device for insertion into a wellbore for cutting the casing of the wellbore from within the wellbore. The cutting device of the '396 patent comprises a UHP hose connector for connection with a UHP hose in communication with a fluid source; a rotatable UHP tube with a top end in fluid communication with the UHP hose connector and a bottom end opposite the top end; a rotating means in operational communication with the UHP tube for rotating the UHP tube during operation of the cutting device; and a cutter head in fluid communication with the bottom end of the UHP tube.

SUMMARY

Issues continue to exist with cutting devices for insertion into a wellbore. Particularly, previous cutting devices using UHP hoses, such as provided in the '396 patent, require a complex system of connectors to effectuate the rotatable movement of the UHP hose. Thus, a need continues to exist for cutting devices using UHP hoses that are simpler in construction therefore less likely to fail. The present disclosure address these and other issues by providing a cutting device for insertion into a wellbore for cutting the casing of the wellbore from within the wellbore with a revolvable UHP hose (i.e., able to be revolved); not a rotating UHP hose.

In accordance with one exemplary aspect, an embodiment of the present disclosure may provide a cutting device using an ultrahigh pressure (UHP) hose carrying UHP fluid is designed to be inserted into a pipe or tube and cut the same from the inside out. In one example, the cutting device is for insertion into a wellbore for cutting the casing of the wellbore from within the wellbore with a revolvable UHP hose. The cutting head which effectuates the cut may be centered by a centering device that is generally conical in shape such that a portion of the centering device remains exterior to the pipe or tube as the UHP revolves during the cutting action.

In accordance with one exemplary aspect, an embodiment of the present disclosure may provide pipe cutting device comprising: a proximal first end and a distal second end defining a longitudinal axis extending therebetween; a motor and operatively connected gears that move in response to operation of the motor; an elongated support member including an outer surface; a cutting head coupled with the elongated support member near the second end; an ultrahigh pressure (UHP) hose positioned exterior to the outer surface of the elongated support member, wherein the UHP hose is eccentric to the longitudinal axis and the UHP hose revolves around the longitudinal axis in response to movement of the gears driven by the motor; and wherein the cutting head is adapted to outflow UHP fluid towards an inner surface of a pipe when the cutting head is inserted therein. This embodiment or another exemplary embodiment may provide a home first position of the UHP hose and an at least one-half revolution second position of the UHP hose, wherein the UHP hose revolves around the longitudinal axis exterior to the outer surface of the elongated member from the first position to the second position. This embodiment or another exemplary embodiment may provide wherein UHP hose does not rotate about the longitudinal axis. This embodiment or another exemplary embodiment may provide wherein the UHP hose revolves at least 180° around the longitudinal axis in the wrapped second position. This embodiment or another exemplary embodiment may provide wherein the UHP hose revolves about 360° around the longitudinal axis in the second position This embodiment or another exemplary embodiment may provide wherein the cutting head includes a first inlet, a second inlet and an outlet; and the UHP hose is coupled with the first inlet of the cutting head offset from the longitudinal axis. This embodiment or another exemplary embodiment may provide an abrasive feed line extending centrally along the longitudinal axis; wherein the abrasive feed line is coupled with the second inlet of the cutting head. This embodiment or another exemplary embodiment may provide wherein the elongated support member is tubular in shape including an inner surface defining a bore, and the abrasive feed line is disposed within the bore having a narrower diameter than the bore. This embodiment or another exemplary embodiment may provide a focus tube on the cutting head and wherein UHP fluid is mixed with abrasive in a venturi chamber and is directed through the focus tube towards an inner surface of a pipe when the cutting head is inserted into the pipe. This embodiment or another exemplary embodiment may provide wherein the first inlet on the cutting device receiving UHP fluid therethrough is spaced from the longitudinal axis, and the second inlet receiving abrasive therethrough is co-axial with the longitudinal axis. This embodiment or another exemplary embodiment may provide an internal diameter of the elongated support member; an outer diameter of the UHP hose positioned exterior to the elongated member; wherein a ratio of the internal diameter of the elongated member relative to the outer diameter of the UHP hose is in a range from about 1:1 to about 3:1. This embodiment or another exemplary embodiment may provide wherein the ratio is about 1.5:1. This embodiment or another exemplary embodiment may provide an elongated channel formed in the outer surface of the elongated support member extending from proximate the first end towards the second end. This embodiment or another exemplary embodiment may provide an arcuate cross section of the channel complementary to a curvature of the UHP hose, wherein the at least a portion of the UHP hose nests within the channel. This embodiment or another exemplary embodiment may provide a second longitudinal axis associated with the UHP hose, wherein the second longitudinal axis of the UHP hose is spaced apart from the first longitudinal axis. This embodiment or another exemplary embodiment may provide wherein the second longitudinal axis is substantially parallel to the first longitudinal axis between the first end and the second end of the tubular member. This embodiment or another exemplary embodiment may provide wherein the motor is a hydraulic motor positioned near the first end. This embodiment or another exemplary embodiment may provide a pinion gear on the hydraulic motor operatively connective with a worm gear reducer which is operative coupled with a spur gear. This embodiment or another exemplary embodiment may provide a clamp connected to the UHP hose near the proximal end, and the clamp in operative communication with the gears adapted to revolve the UHP hose in response to movement of the gears. This embodiment or another exemplary embodiment may provide wherein the clamp is located exterior to the pipe to be cut.

In accordance with one aspect, an embodiment of the present disclosure may provide a method of operating a pipe cutting device comprising: inserting a cutting head carried by an elongated support member into a pipe; revolving an ultrahigh pressure (UHP) hose around a longitudinal axis of an elongated support member while UHP fluid moves through the UHP hose; and cutting the pipe with UHP fluid exiting a focus tube. This embodiment or another exemplary embodiment may provide wherein revolving the UHP hose around the longitudinal axis further comprises positioning the UHP hose exterior to an outer surface of the elongated support member. This embodiment or another exemplary embodiment may provide wherein revolving the UHP hose around the longitudinal axis of the elongated support member further comprises: positioning the UHP hose in a channel formed by the outer surface of the elongated support member when the cutting device is in a neutral position; maintaining the UHP hose in the channel as the UHP hose revolves around the longitudinal axis exterior to the outer surface of the elongated support member. This embodiment or another exemplary embodiment may provide wherein revolving the UHP hose around the longitudinal axis of the elongated support member further comprises completing at least a one-half revolution of the UHP hose around the longitudinal axis in a first direction. This embodiment or another exemplary embodiment may provide wherein revolving the UHP hose around the tubular support member further comprises completing at least one revolution of the UHP hose around the longitudinal axis in the first direction. This embodiment or another exemplary embodiment may provide wherein subsequent to completing the one-half revolution of the UHP hose around the elongated support member in the first direction, further includes completing a second one-half revolution of the UHP hose around the longitudinal axis in an opposite second direction. This embodiment or another exemplary embodiment may provide flowing UHP fluid offset parallel to a central longitudinal axis. This embodiment or another exemplary embodiment may provide preventing UHP fluid from ever flowing coaxial with the longitudinal axis. This embodiment or another exemplary embodiment may provide moving the UHP hose eccentrically during revolution around the longitudinal axis. This embodiment or another exemplary embodiment may provide revolving the UHP hose from a home first position to a second position, wherein the UHP hose does not rotate about the longitudinal axis during the revolution around the longitudinal axis from the first position to the second position. This embodiment or another exemplary embodiment may provide positioning the UHP hose at least 180° from the home first position relative to the pipe to be cut. This embodiment or another exemplary embodiment may provide positioning the UHP hose at least 360° from the home first position relative to the pipe to be cut. This embodiment or another exemplary embodiment may provide coupling an end of the UHP hose with a first inlet of the cutting head offset from the longitudinal axis. This embodiment or another exemplary embodiment may provide feeding an abrasive substance centrally along the longitudinal axis in an abrasive feed line. This embodiment or another exemplary embodiment may provide wherein the elongated member is tubular in shape including an inner surface defining a bore, and the abrasive feed line is disposed within the bore having a narrower diameter than the bore. This embodiment or another exemplary embodiment may provide mixing the abrasive substance with UHP fluid near a focus tube on the cutting head to create a cutting mixture; and directing the cutting mixture towards an inner surface of a pipe.

In accordance with one aspect, an embodiment of the present disclosure may provide a pipe cutting device comprising: a proximal end and a distal end defining a longitudinal axis extending therebetween; a hydraulic motor positioned near the proximal end coupled with gears that move in response to operation of the motor; a supportive tubular member including an outer surface facing away from the longitudinal axis and an inner surface facing the longitudinal axis and the inner surface defining a bore extending from adjacent the first end to adjacent the second end, wherein the longitudinal axis extends centrally through the bore, and the tubular member includes a first end associated with the proximal end of the pipe cutting device and a second end associated with the distal end of the cutting device; a cutting head coupled with the second end of the tubular member near the distal end, the cutting head including a first inlet, a second inlet and an outlet, an abrasive feed line or hose disposed within the bore having a narrower diameter than the bore and extending centrally along the longitudinal axis; an ultrahigh pressure (UHP) hose positioned exterior to the outer surface of the tubular member, wherein the UHP hose is eccentric to the longitudinal axis, wherein the UHP hose revolves around the longitudinal axis in response to the motor rotating the cutting head and the UHP hose does not rotate about the longitudinal axis; wherein the revolution of the UHP hose in response to the operation of the motor wraps a portion of the UHP hose around the outer surface of the tubular member, wherein the wrapped portion of the UHP hose completes a 360° revolution (or at least 180°) around the outer surface of the tubular member; and wherein the UHP hose is coupled with the first inlet of the cutting head, the abrasive feed line is coupled with the second inlet of the cutting head and the outlet is adapted to outflow mixed UHP fluid and abrasive towards an inner surface of a pipe when the pipe cutting device is inserted into the pipe distal end first.

In another aspect, an exemplary embodiment of the present disclosure may provide a pipe cutting device comprising: a proximal first end and a distal second end defining a longitudinal axis extending therebetween; a motor and operatively connected gears that move in response to operation of the motor; a structurally supportive elongated member including an outer surface; a cutting head coupled with the elongated member near the second end; an ultrahigh pressure (UHP) hose positioned exterior to the outer surface of the elongated member, wherein the UHP hose is eccentric to the longitudinal axis and the UHP hose revolves around the outer surface of the elongated member in response to movement of the gears driven by the motor; and wherein the cutting head is adapted to outflow UHP fluid towards an inner surface of a pipe when the cutting head is inserted therein. This embodiment or another exemplary embodiment may provide a home first position of the UHP hose and a wrapped second position of the UHP hose, wherein the UHP hose revolves around the longitudinal axis exterior to the outer surface of the elongated member from the first position to the second position. This embodiment or another exemplary embodiment may provide wherein UHP hose does not rotate about the longitudinal axis. This embodiment or another exemplary embodiment may provide wherein the UHP hose wraps at least 180° around the outer surface of the elongated member in the wrapped second position. This embodiment or another exemplary embodiment may provide wherein the UHP hose wraps about 360° around the outer surface of the elongated member in the wrapped second position. This embodiment or another exemplary embodiment may provide wherein the cutting head includes a first inlet, a second inlet and an outlet; and the UHP hose is coupled with the first inlet of the cutting head offset from the longitudinal axis. This embodiment or another exemplary embodiment may provide an abrasive feed line extending centrally along the longitudinal axis; wherein the abrasive feed line is coupled with the second inlet of the cutting head. This embodiment or another exemplary embodiment may provide wherein the elongated member is tubular in shape including an inner surface defining a bore, and the abrasive feed line is disposed within the bore having a narrower diameter than the bore. This embodiment or another exemplary embodiment may provide a focus tube on the cutting head and wherein UHP fluid is mixed with abrasive near the focus tube and the mixture is directed towards an inner surface of a pipe when the cutting head is inserted into the pipe. This embodiment or another exemplary embodiment may provide wherein the first inlet on the cutting device receiving UHP fluid therethrough is spaced from the longitudinal axis, and the second inlet receiving abrasive therethrough is co-axial with the longitudinal axis. This embodiment or another exemplary embodiment may provide an internal diameter of the elongated member; an outer diameter of the UHP hose positioned exterior to the elongated member; wherein a ratio of the internal diameter of the elongated member relative to the outer diameter of the UHP hose is in a range from about 1:1 to about 3:1. This embodiment or another exemplary embodiment may provide wherein the ratio is about 1.5:1. This embodiment or another exemplary embodiment may provide an elongated channel formed in the outer surface of the elongated member extending from proximate the first end towards the second end. This embodiment or another exemplary embodiment may provide an arcuate cross section of the channel complementary to a curvature of the UHP hose, wherein the at least a portion of the UHP hose nests within the channel. This embodiment or another exemplary embodiment may provide a second longitudinal axis associated with the UHP hose, wherein the second longitudinal axis of the UHP hose is spaced apart from the first longitudinal axis. This embodiment or another exemplary embodiment may provide wherein the second longitudinal axis is substantially parallel to the first longitudinal axis between the first end and the second end of the tubular member prior to revolving the UHP hose around the tubular member. This embodiment or another exemplary embodiment may provide wherein the motor is a hydraulic motor positioned near the first end. This embodiment or another exemplary embodiment may provide a pinion gear on the hydraulic motor operatively connective with a worm gear reducer which is operative coupled with a spur gear. This embodiment or another exemplary embodiment may provide a clamp connected to the UHP hose near the proximal end, and the clamp in operative communication with the gears adapted to move the UHP hose in response to movement of the gears. This embodiment or another exemplary embodiment may provide wherein the cutting head includes a stem having a length and the first inlet is located near an end of the stem; wherein the length of the stem is oriented perpendicular to the longitudinal axis. This embodiment or another exemplary embodiment may provide wherein the cutting head includes a stem having a length and the first inlet is located near an end of the stem; wherein the length of the stem is offset parallel to the longitudinal axis.

In another aspect, an exemplary embodiment of the present disclosure may provide a method of cutting a pipe comprising: inserting a distal end of a pipe cutting device into a pipe, wherein a cutting head is located near the distal end; revolving an ultrahigh pressure (UHP) hose around an outer surface of a supportive tubular member carrying the cutting head while the cutting head is rotated about a longitudinal axis.

In yet another aspect, an exemplary embodiment of the present disclosure may provide a method of operating a pipe cutting device comprising: inserting a cutting head carried by an elongated support member into a pipe; revolving an ultrahigh pressure (UHP) hose around the elongated support member while UHP fluid moves through the UHP hose; and cutting the pipe with UHP fluid exiting a focus tube. This embodiment or another embodiment may provide wherein revolving the UHP hose around the elongated support member further comprises positioning the UHP hose exterior to an outer surface of the elongated support member. This embodiment or another embodiment may provide wherein revolving the UHP hose around the elongated support member further comprises: positioning the UHP hose in a channel formed by the outer surface of the elongated support member when the cutting device is in a neutral position; and effecting the UHP hose to exit the channel as the UHP hose revolves around the outer surface of the elongated support member. This embodiment or another embodiment may provide wherein revolving the UHP hose around the elongated support member further comprises completing at least a one-half revolution of the UHP hose around the elongated support member in a first direction. This embodiment or another embodiment may provide wherein revolving the UHP hose around the tubular support member further comprises completing at least one revolution of the UHP hose around the elongated support member in the first direction. This embodiment or another embodiment may provide wherein subsequent to completing the one-half revolution of the UHP hose around the elongated support member in the first direction, further includes completing a second one-half revolution of the UHP hose around the elongated support member in an opposite second direction. This embodiment or another embodiment may provide flowing UHP fluid offset parallel to a central longitudinal axis. This embodiment or another embodiment may provide preventing UHP fluid from ever flowing coaxial with the longitudinal axis. This embodiment or another embodiment may provide moving the UHP hose eccentrically during revolution around the longitudinal axis. This embodiment or another embodiment may provide revolving the UHP hose from a home first position to a wrapped second position, wherein the UHP hose does not rotate about the longitudinal axis during the revolution around the longitudinal axis from the first position to the second position. This embodiment or another embodiment may provide wrapping the UHP hose at least 180° around the outer surface of the elongated member. This embodiment or another embodiment may provide wrapping the UHP hose wraps about 360° around the outer surface of the elongated member in the wrapped second position. This embodiment or another embodiment may provide coupling an end of the UHP hose with a first inlet of the cutting head offset from the longitudinal axis. This embodiment or another embodiment may provide feeding an abrasive substance centrally along the longitudinal axis in an abrasive feed line. This embodiment or another embodiment may provide wherein the elongated member is tubular in shape including an inner surface defining a bore, and the abrasive feed line is disposed within the bore having a narrower diameter than the bore. This embodiment or another embodiment may provide mixing the abrasive substance with UHP fluid near a focus tube on the cutting head to create a cutting mixture; directing the cutting mixture towards an inner surface of a pipe. This embodiment or another embodiment may provide wherein the first inlet on the cutting device receiving UHP fluid therethrough is spaced from the longitudinal axis, and the second inlet receiving abrasive therethrough is co-axial with the longitudinal axis.

In accordance with yet another aspect, an exemplary embodiment of the present disclosure may provide a centering device for centering a utility tool in a pipe or tube when the utility tool at least partially is inserted therein, the centering device comprising: a first member including a first edge angled relative to a longitudinal axis of a pipe or tube; a second member including a second edge angled relative to the longitudinal axis; wherein the first and second member are radially spaced from each other relative to the longitudinal axis; and wherein the first and second edges are adapted to be angularly contact the pipe or tube in a slanted alignment. This embodiment or another embodiment may provide a third member including a third edge angled relative to the longitudinal axis. This embodiment or another embodiment may provide wherein the first support member is spaced about 120° from the second support member relative to the longitudinal axis. This embodiment or another embodiment may provide a plate rigidly connected with respective upper ends of the first, second, and third edges. This embodiment or another embodiment may provide a first surface and an opposing second surface; and an outer edge and an inner edge defining an central aperture extending fully through the plate from the first surface to the second surface and the longitudinal axis extending centrally through the center aperture. This embodiment or another embodiment may provide wherein the first, second, and third edges are sized to contact a portion of an upper circumferential edge of the pipe or tube. This embodiment or another embodiment may provide a lower end on each of the first, second, and third members, wherein the lower ends are positioned radially outward of the inner edge defining the central aperture relative to the longitudinal axis. This embodiment or another embodiment may provide a collar attached to the lower end of the first, second, and third members respectively. This embodiment or another embodiment may provide an upper end on the first edge that remains exterior to the pipe or tube in response to revolution of a portion of the utility tool inside the pipe or tube.

In yet another aspect, an exemplary embodiment of the present disclosure may provide a device for effecting a pipe or tube when the device is at least partially inserted therein, the device comprising: an elongated support member including first and second ends, wherein the support member is oriented similar to a longitudinal axis of a pipe or tube; a utility tool coupled near the second end of the elongated support adapted to be inserted into the pipe or tube, the utility tool adapted to perform a function that effects the pipe or tube; and a centering device near the first end of the elongated support for centering the device relative to the pipe or tube, the centering device including a first edge that is angled between 10° and 80° relative to the longitudinal axis and the first edge is adapted to contact at least a portion of an inner circumferential edge of the pipe or tube. This embodiment or another embodiment may provide wherein the first edge on the centering device includes a first end and a second end, wherein when the centering device centers the devices within the pipe or tube, the first end of the first edge is exterior to the pipe or tube and the second end of the first edge is interior to the pipe or tube. This embodiment or another embodiment may provide a second edge on the centering device spaced radially from the first edge relative to the longitudinal axis, wherein the second edge is angled between 10° and 80° relative to the longitudinal axis and the second edge is adapted to contact at least a portion of the inner circumferential edge of the pipe or tube, wherein the second support includes a first end and a second end, wherein when the centering device centers the device within the pipe or tube, the first end of the second edge is exterior to the pipe or tube and the second end of the second edge is interior to the pipe or tube. This embodiment or another embodiment may provide wherein the centering device further includes: a first support angled relative to the longitudinal axis, wherein the first edge is on the first support; and a second support angled relative to the longitudinal axis, wherein the second edge is on the second support. This embodiment or another embodiment may provide wherein the centering device further includes: a third support angled relative to the longitudinal axis, wherein a third edge is on the third support; and wherein the third support includes a first end and a second end, wherein when the centering device centers the device within the pipe or tube, the first end of the third edge is exterior to the pipe or tube and the second end of the third edge is interior to the pipe or tube. This embodiment or another embodiment may provide wherein the first and second supports on the centering device are at an angle in a range from 30° to 60° relative to the longitudinal axis. This embodiment or another embodiment may provide wherein the first ends of the first support and the second support are both positioned along an imaginary circumferential curve defined by $X^2+Y^2=R^2$, wherein a R is a first radius of an inner surface of the pipe or tube relative to the longitudinal axis and a second radius of the first ends of the first and second supports relative to the longitudinal axis is greater than the first radius so as to position the first ends exterior from the inner surface of the pipe or tube. This embodiment or another embodiment may provide a motor for revolving tubing around the elongated support member including an outer end that is positioned radially outward from the first ends of the first support and the second supports on the centering device. This embodiment or another embodiment may provide a plate having a diameter greater than that of the tube or pipe; a collar having a diameter less than that of the tube or pipe; and wherein the first ends of the first and second supports are connected with the plate and positioned radially exterior to the tube or pipe and the second ends of the first and second supports are connected with the collar and positioned radially interior to the tube or pipe. This embodiment or another embodiment may provide wherein the collar is positioned around the first support member and concentric therewith along the longitudinal axis. This embodiment or another embodiment may provide wherein the centering device is generally conical in shape. This embodiment or another embodiment may provide wherein the centering device is shaped in an inverted frustoconical configuration.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A subsurface and downhole pipe cutting device is depicted throughout the present disclosure. A first embodiment of the subsurface downhole pipe cutting device is depicted generally at 10A in FIG. 1-FIG. 10. A second embodiment of a subsurface downhole pipe cutting device is depicted generally at 10B in FIG. 11-FIG. 23. Each embodiment of the pipe cutting device 10A, 10B, includes a motor that revolves an ultrahigh pressure (UHP) hose around a longitudinal axis of the cutting device that is centrally aligned with the pipe intended to be cut below the surface of the ground. Device 10A, 10B additionally provide a UHP cutting device for insertion into a wellbore for cutting the casing (i.e., the tube or the pipe) of the wellbore from within the wellbore.

Each cutting device 10A, 10B includes a motor 12, an elongated hollow support member 14 defining the internal bore 16, an abrasive feed line 18, a UHP hose 20, and a cutting head. The cutting head may vary between the first embodiment cutting device 10A and the second embodiment cutting device 10B and as such will be described in greater detail below with respect to each embodiment 10A, 10B.

Figure 1:
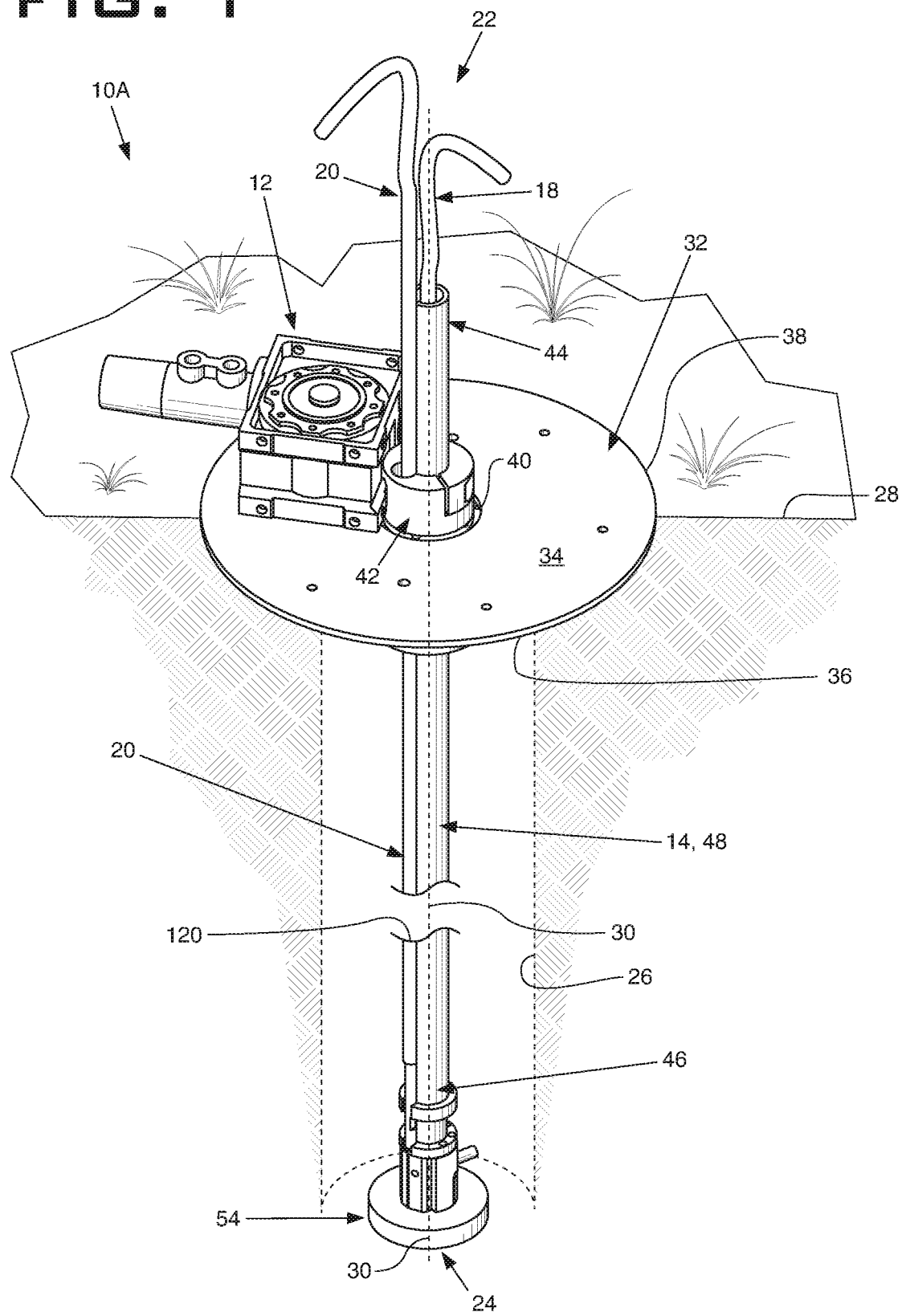
FIG. 1 is a diagrammatic perspective view of a pipe cutting device in accordance with the first embodiment of the present disclosure.

As depicted in FIG. 1, cutting device 10A includes an upper end 22 and a lower end 24. Lower end 24 is configured to be inserted into a pipe 26 that is intended to be cut below the surface of ground 28. A longitudinal axis 30 extends from the upper end 22 to the lower end 24 centrally within pipe 26. Additionally, tubular support member 14 extends centrally along longitudinal axis 30 such that the inner bore 16 has an equal radius to all points within the inner surface of support member 14.

Motor 12 is configured to drive a plurality of gears so as to effectuate the revolution of UHP hose 20 around the longitudinal axis 30. In one version, the UHP hose 20 stays in substantially one position and revolves in unison with support member 14 which rotates about the axis 30 (See FIG. 6A and FIG. 7A). In another version, the UHP hose 20 revolves about the axis 30 while wrapping itself around the outside surface of tubular support member 14 (See FIG. 6B and FIG. 76). Hose 20 includes its own axis 31 which is offset from central axis 30. In one embodiment, a portion of the hose axis 31 is parallel to the longitudinal axis 30. In another particular embodiment, the entirety of the hose 20 is offset parallel the longitudinal axis 30.

In one embodiment, motor 12 is positioned above a circular disk or support plate 32 which has a diameter larger than the diameter of pipe 26 that is to be cut. Disk plate 32 includes an upwardly facing top surface 34 spaced apart from a downwardly facing bottom surface 36. A circular edge 38 bounds the top surface 34 and the lower surface 36. The perimeter of circular edge 38 depends on the diameter of disk plate 32; however, in one embodiment, the perimeter is substantially continuous and uninterrupted around the entire disk plate 32. Disk plate 32 may further include an inner circular edge 40 defining a vertical through aperture extending from the first surface 34 to the second surface 36. The central aperture is formed so as to define the disk plate 32 as a substantially annular planar plate. The upper surface 34 of disk plate 32 in between outer edge 38 and inner edge 40 creates a space upon which motor 12 is supported. In one particular embodiment, motor 12 is offset from longitudinal axis 30 so as to be positioned above the top surface 34, disk plate 32 and not intersect the longitudinal axis 30. In one embodiment, motor 12 is a hydraulic motor.

The aperture in disk plate 32 defined by inner edge 40 receives therethrough the tubular support member 14, the abrasive feed line 18, and the UHP hose 20. A collar 42 is operatively connected to motor 12 adjacent the inner edge 40 of disk plate 32. Collar 42 receives UHP hose 20 and tubular support member 14 therethrough. Collar 42 positions UHP hose 20 in an offset manner from longitudinal axis 30 so that no portion of UHP hose 20 intersects or is coaxial with longitudinal axis 30 of cutting device 10A. In one particularly embodiment, collar 42 is fabricated from a substantially rigid material so as to be strong enough to support and carry the load of the tubular support member 14 extending therethrough.

Collar 42 is configured to rigidly secure the supportive member 14 therein. Additionally, the UHP hose 20 is secured in place in an eccentric manner relative to longitudinal axis 30. The eccentric position of the hose 20 refers to the hose 20 not having its axis 31 (i.e., UHP hose axis 31) or other part placed centrally along longitudinal axis 30 Collar 42 is substantially concentric with longitudinal axis 30. Thus, when motor 12 is turned on and in a drive mode, the collar 42 is driven by the motor and rotates about the longitudinal axis 30. Additionally, the tubular support member 14 is also rotated around axis 30. The UHP hose is carried by the collar 42 and positioned outside (and effectively carried by) the supportive member 14 so as to revolve around the longitudinal axis. Note: other embodiments are envisioned in other version in which the UHP hose may wrap around the tubular support member 14 and those alternatives are addressed in FIG. 6B and FIG. 7B (as well as FIG. 9B and FIG. 10B for device 10B).

Tubular support member 14 includes an upper first end 44 and a lower second end 46. Tubular support member 14 includes a rigid cylindrical sidewall 48 extending from the first end 44 to the second end 46. In one embodiment, the cylindrical sidewall 48 is fabricated from metal and is substantially rigid material so as to provide structural integrity to the cutting device 10A when the cutting head is located down within pipe 26 to be cut below the ground surface 28. Cylindrical sidewall 48 includes an outer surface 50 (FIG. 4) and an inner surface 52 (FIG. 4) defining the central bore 16. Along the length of the tubular support member 14, the UHP hose 20 is positioned externally of the outer surface 52 along all points of the tubular support member 14. In another embodiment, there may only be a portion of the UHP hose positioned externally of the outer surface 52 of tubular support member 14. The abrasive feed line 18 is positioned internally within the bore 16 offset from the inner surface 50 of cylindrical sidewall 14 along the longitudinal length of the tubular support member 14. Stated otherwise, a slight gap is formed between abrasive feed line 18 and the inner surface 52 of cylindrical sidewall 48 tubular support member 14. A cutting head 54 is connected with the lower second end 46 of tubular support member 14.

Figure 2:
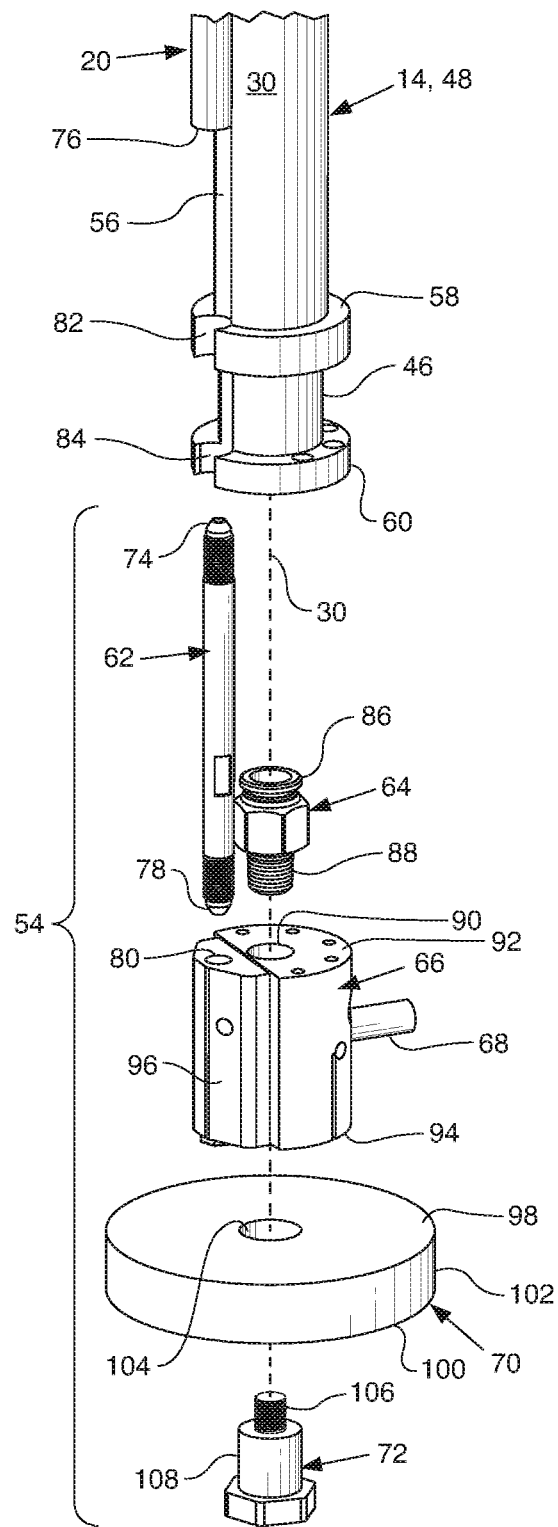
FIG. 2 is an exploded perspective view of a cutting head on the first embodiment cutting device.

FIG. 2 depicts that tubular support member 14 defines a longitudinally extending channel 56 along its outer surface 50. UHP hose 20 may reside within channel 56 along the longitudinal length of tubular support member 14. In one embodiment, channel 56 has an arcuate cross-section complementary to that of the radius of curvature of the exterior surface of UHP hose 20. However, it is understood that channel 56 may have differing cross-sections so as to not be complementary to that of UHP hose 20. Furthermore, tubular support member 14 may not include a channel formed on the outer surface 50 thereof such that UHP hose 20 may be positioned externally to outer surface 50 and freely hang in slight contact or at a slight offset from tubular support member 14. In each instance, commonality is in the fact that the UHP hose 20 revolves around the longitudinal axis 30 and is exterior to the outer surface 50 of tubular support member 14 and not located within the central bore such that no portion of UHP hose 20 is able to rotate about longitudinal axis 30.

A collar 58 and a flange 60 rigidly connected with cylindrical sidewall 48 near lower second end 46. Collar 58 is a substantially annular member extending around the outer surface 50 of cylindrical sidewall 48 and defines an arcuate cutout 82 to define a portion of channel 56. Flange 60 is an annular member extending around the outer surface of cylindrical sidewall 48 and includes an arcuate cutout 84 complementary to that of channel 56. Flange 60 may further include a plurality of through holes extending from the top surface of flange 60 therethrough to the bottom surface of flange 60 eccentric and spaced apart offset from longitudinal axis 30 adapted to receive screws or other fasteners therethrough to connect flange 60 with portions of cutting head 54. While collar 58 and flange 60 are spaced apart from each other in a longitudinal manner, it is contemplated that other embodiments may only include flange 60.

FIG. 2 depicts further components of cutting head 54 that effectuate the cutting of pipe 26 below the ground surface 28 while revolving UHP hose 20 about the longitudinal axis 30 while remaining, at least partially, exterior to outer surface of tubular support member 14. With continued reference to FIG. 2, cutting device 54 located at the lower end 24 of cutting device 10A includes a nipple 62, a threaded couple 64, a rigid body 66, a focus tube 68, an annular plate 70, and a connector 72.

Figure 3:
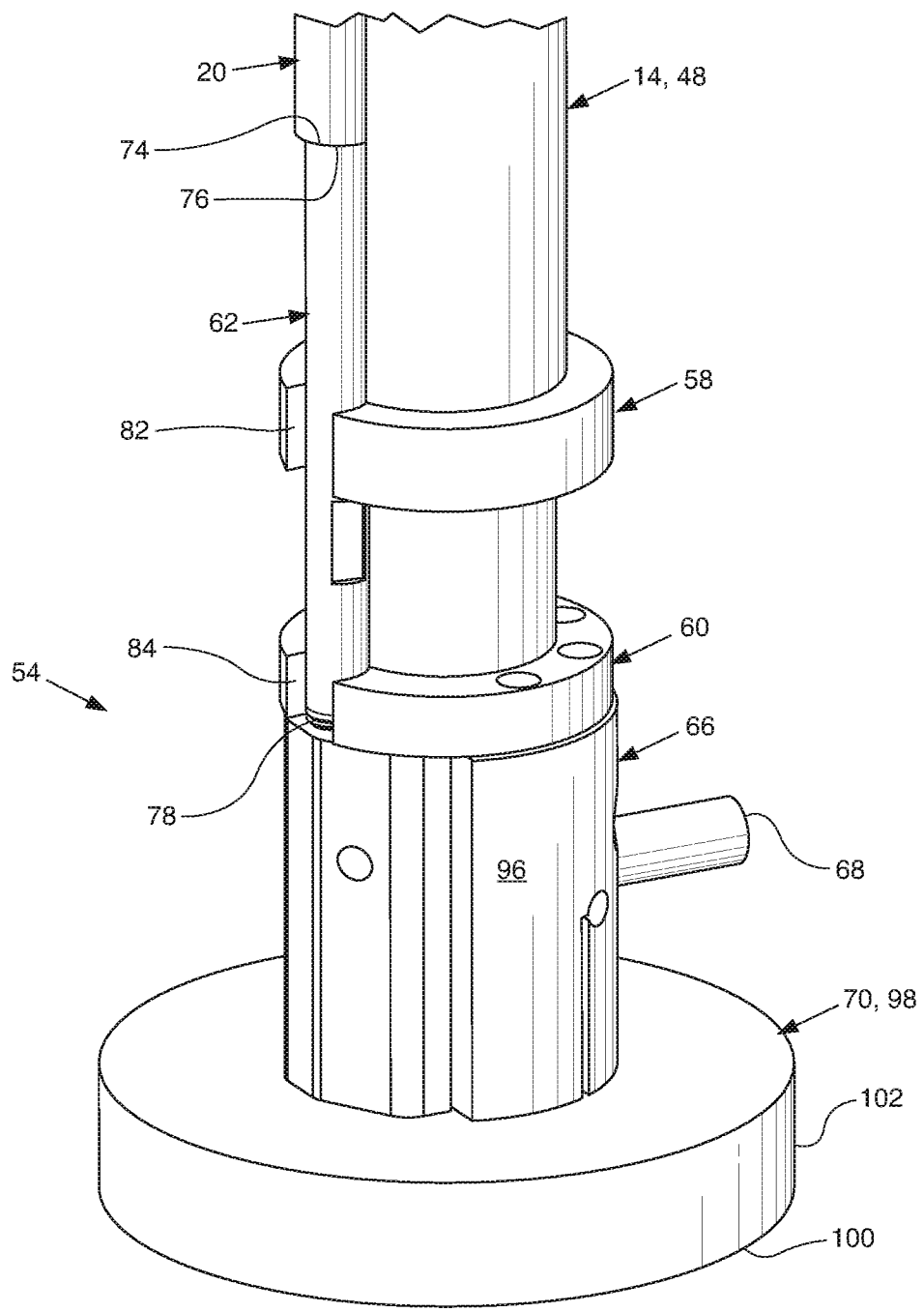
FIG. 3 is an assembled perspective view of the cutting head on the first embodiment cutting device.

As depicted in FIG. 2 and FIG. 3, a first end 74 of nipple 62 threadably connects with a lower terminal end 76 of UHP hose 20. The tubular body of nipple 62 is positioned within the lower end of channel 56 below UHP hose 20. The body of nipple 66 is positioned in the channel so as to extend through the arcuate cutout of collar 58 and the arcuate cutout of flange 60. The lower second end 78 of nipple 62 threadably connects with rigid body 66 at a bore 80 and is vertically aligned but offset from longitudinal axis 30. In one embodiment, the radius of curvature associated with the outer surface of nipple 62 is complementary to that of the arcuate cutout 82 formed and defined by collar 58 which is aligned with channel 56. In this instance, the arcuate cutout 84 formed by flange 60 is complementary to the outer surface of nipple 62. Collar 58 and flange 60 engage and support nipple 62 so as to brace the same against forces of the UHP tube as it revolves about longitudinal axis 30 during the cutting of pipe 26 below ground 28.

Threaded couple 64 is rigid a hollow body member including threads at both ends that define a bore therethrough and is substantially centered about longitudinal axis 30. Threaded couple 64 extends into the bore 16 adjacent the lower end 46 of cylindrical sidewall 48 on tubular support member 14. Threaded couple 64 is coaxial and aligned with longitudinal axis 30 and fluidly couples with the abrasive feed line 18 within the bore 16. In one embodiment, portions of the threaded couple 64 may engage inner surface 52 of tubular support member 14. A threaded upper end 86 of threaded couple 64 may threadably connect with the lower end of feed line 18. However, other connections are entirely possible. The lower threaded end 88 of threaded couple 64 threadably couples with a central hole 90 on rigid body 66. Central hole 90 is aligned coaxial with longitudinal axis 30. This effectively enables abrasive feed line 18 to be coaxial along the length of longitudinal axis 30. Stated otherwise, abrasive feed line 18 is not offset from longitudinal axis 30.

Rigid body 66 includes an annular top surface 92 and a bottom surface 94. A generally cylindrical sidewall 96 extends between the top surface 92 and the bottom surface 94. Focus tube 66 is oriented perpendicular to longitudinal axis 30 so as to extend through an aperture formed in and extending through the cylindrical sidewall 96 of rigid body 66. Annular plate 70 includes an annular top surface 98 spaced apart from an annular bottom surface 100 and a cylindrical sidewall 102 extending therebetween. The annular top surface 98 contacts the bottom surface 94 of rigid body 96. In one embodiment, a central aperture 102 extending from the bottom surface 100 to the top surface 98 of annular plate 70 is aligned coaxial and centered with longitudinal axis 30. The diameter of annular plate 70 is larger than that of rigid body 66. However, the vertically aligned thickness or height of annular plate 70 is less than that of rigid body 66. Annular plate 70 may be utilized in some embodiment to center the cutting head within the pipe 26 to be cut. Aperture 104 receives fastener 72 therethrough which includes a threaded top end 106 to threadably connect with rigid body 66. Fastener 72 includes a stepped out portion 108 which has a similar diameter to that of aperture 104 formed in annular plate 70. Fastener 72 extends along the longitudinal axis 30 and intersects the same and includes an enlarged head having a diameter greater than the diameter of aperture 104 preventing the fastener 72 from passing therethrough. The enlarged head of fastener 72 is positioned outwardly and below the lower second surface 100 of annular plate 70. While not shown, it is entirely possible for a second annular or circular plate to be attached to the rigid body 66 above the focus tube 68. In one instance, the second plate connects with a bracket located near the bottom end of the tubular support member 14. Both annular plates cooperate to center the device within the pipe to be cut, which is helpful in the event the tubular support member 14 ever is bent.

Focus tube 68 is positioned intermediate the top surface 92 and the bottom surface 94 of rigid body 66. In one embodiment, focus tube 68 is located approximately midway between the top surface 92 and the bottom surface 94. However, other vertical positions of the focus tube 68 relative to the rigid body 66 are envisioned. Focus tube 68 includes a portion thereof that is embedded within rigid body 66 and retained at a shoulder. Additionally, focus tube 68 includes a portion that extends outwardly in a cantilevered manner from a rigid connection with the cylindrical sidewall 96 of rigid body 66. In another embodiment, the focus tube 68 extends outwardly in a cantilevered manner from the rigid body 66. However, in this alternative example, there is no rigid connection established therebetween so as to enable the focus tube to slideably fit and move in a transverse direction relative to rigid body 66. This may effectuate the adjustment of focus tube 68 so as to enable the offset from the pipe 26 to be cut to be optimized. Optimizing the offset depends on the pressure within UHP hose 20 and feed line 18. Fluid pressure exiting the focus tube 68 is what cuts pipe 26. In one embodiment, the length of focus tube 68, particularly the exposed portion of focus tube 68 that is not embedded within rigid body 66, has a transversely aligned length that is less than the radius of plate 70 relative to axis 30. In other embodiments, the focus tube 68 may have a transversely aligned length that is greater than the diameter of plate 70 such that the outermost end of focus tube 68 is the widest portion of the cutting head 54. Alternatively, the diameter of plate 70 may have the largest outer diameter of cutting head 54 as shown on FIG. 2. and FIG. 3.

Figure 4:
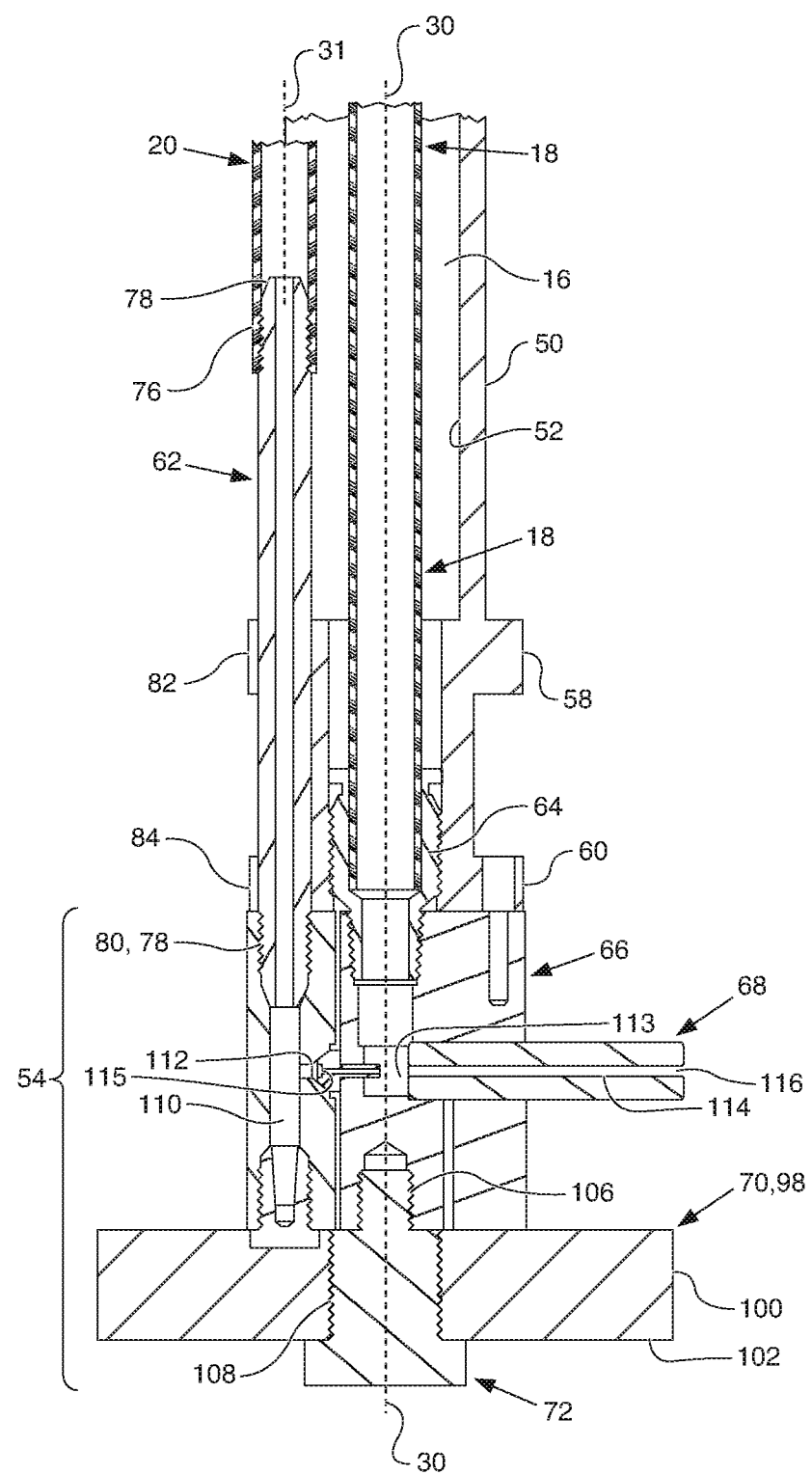
FIG. 4 is an elevational cross-section view of the cutting head on the first embodiment cutting device.

FIG. 4 depicts an assembled cross-section of the cutting device and the lower end 46 of tubular support member 14. When assembled, the UHP hose 20, the nipple 62, and the rigid body 66 define a conduit for which UHP fluid can flow through the UHP hose 20, then through the nipple 62 then into a vertically aligned bore 110 in operative communication with nipple 62. Bore 110 is vertically aligned and offset from longitudinal axis 30. A lower region of bore 110 may act as a well to trap some portions of fluid moving through hose 20. An outlet 112 to bore 110 is aligned perpendicularly (i.e., transverse) thereto and in fluid communication with the bore 114 defined by focus tube 68. The outlet 112 is positioned above the bottom of bore 110 acting as a well. The outlet 112 is defined by a jewel or gem 115, sometime diamond or sapphire, which is able to withstand the immense pressure of the fluid moving through the outlet 112. When UHP fluid flowing through UHP hose 20, nipple 62, and bore 110 exits outlet 112 into bore 114 of focus tube 68. UHP fluid intersects the longitudinal axis 30 in a perpendicular manner. Stated otherwise, UHP fluid never flows coaxial the longitudinal axis 30. The UHP fluid movement is offset parallel to longitudinal axis 30, and the only time UHP fluid intersects longitudinal axis 30, it is in a perpendicular manner when in the focus tube 68.

With continued reference to FIG. 4, the abrasive feed line 18 extends coaxial with longitudinal axis 30 such that a significant portion of the flow of abrasive fluid moving along feed line 18 is coaxial with longitudinal axis 30 until the abrasive fluid flows through threaded couple 64 and into the bore 114 so as to mix with the UHP fluid in the focus tube 68 in a mixing region which acts a venturi region 113. The venturi mixing region 113 enables the high pressure fluid to pull the abrasive down along line 18 and outwardly through bore 114. Thereafter the mixed UHP fluid and abrasive fluid exit the bore 114 of the focus tube 68 at outlet 116.

Mixture of the UHP fluid and the abrasive fluid exiting the bore have a sufficiently high pressure and abrasion combination so as to effectuate a cut to the pipe 26. In one embodiment, the pressure may exceed 40,000 psi so as to be suitable for cutting both cement and stainless steel pipes 26. The pressure may be controlled by computer module that can be supplied with the device 10A, 10B. The computer module may further include at least one non-transitory computer readable storage medium having instructions encoded thereon that when executed by one or more processors inside the computer module, implement operations to effectuate the cutting of the pipe 26 by revolving UHP hose 20 around the outside of tubular support 14. The operations may include driving the motor 12 as determined by the set of instructions at a desired speed or revolution. The operations may further include revolving the UHP hose around the outside of the tubular support 14 in a manner determined by the instructions contained on the at least one non-transitory computer readable storage medium. Operations may further include effectuating cutting the pipe 26 through the combination of UHP fluid and abrasive fluid exiting the focus tube 68 at a pressure and speed determined by the instructions encoded on the at least one non-transitory computer readable storage medium.

FIG. 5-FIG. 10 depict varying operational views of device 10A having cutting head 54 attached to the lower end 24 thereof. The cutting device 10A effectuates the cutting of pipe 26 along a cut line 118. When the pipe 26 is cut along cut line 118, it is severed into two sections. An upper section of pipe 26A may be removed from the ground 28 and the lower section of pipe 26B may remain subsurface or below the ground surface 28 and can be capped in order to seal the pipe 26 safely within the ground. The cutter head 54 uses a combination of abrasive fluid and ultrahigh pressure liquid to effectuate the cut of pipe 26 along cut line 118.

Figure 5:
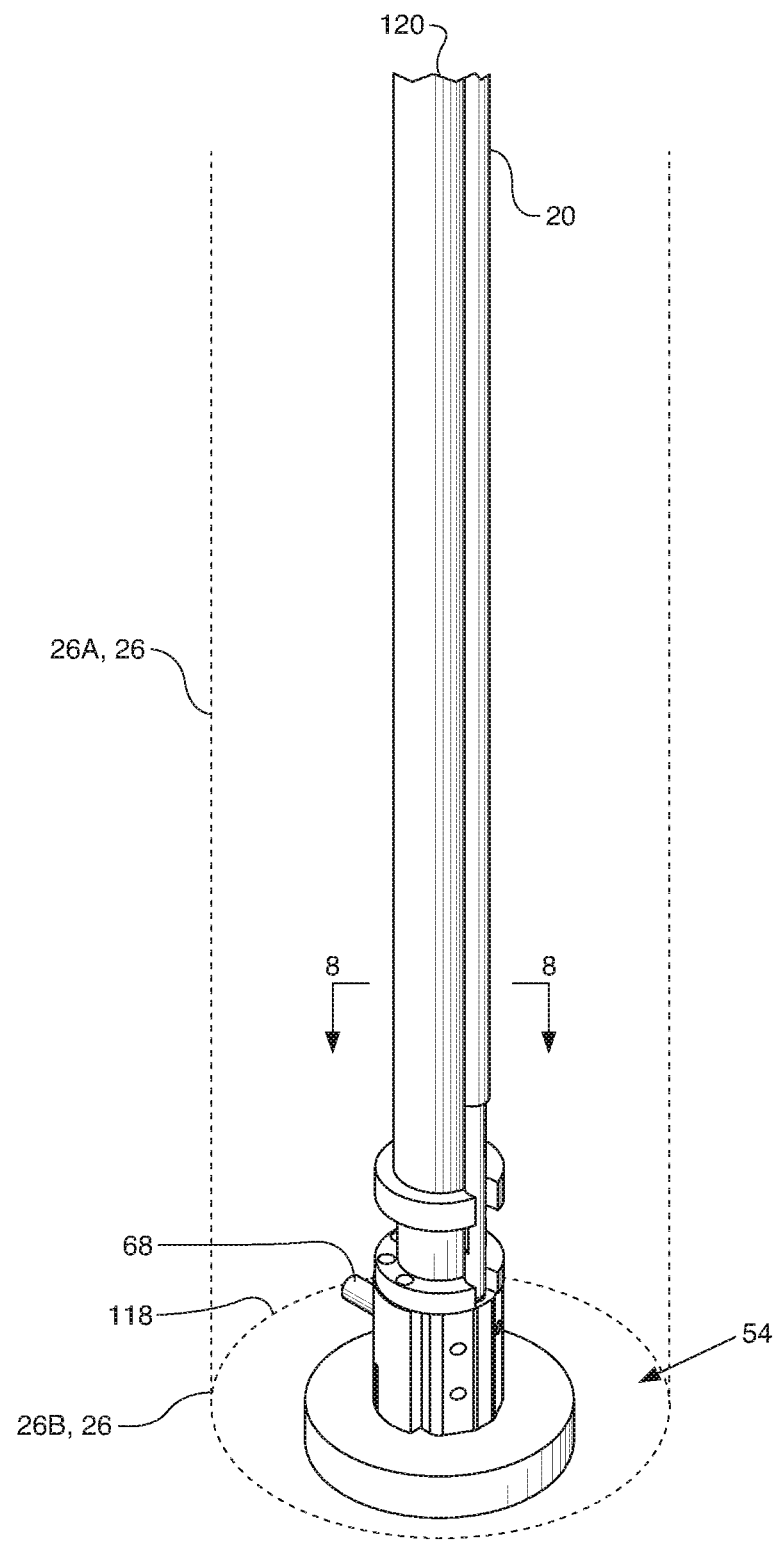
FIG. 5 is an operational perspective view of the first embodiment cutting device located in a pipe positioned at a first position.
Figure 8:
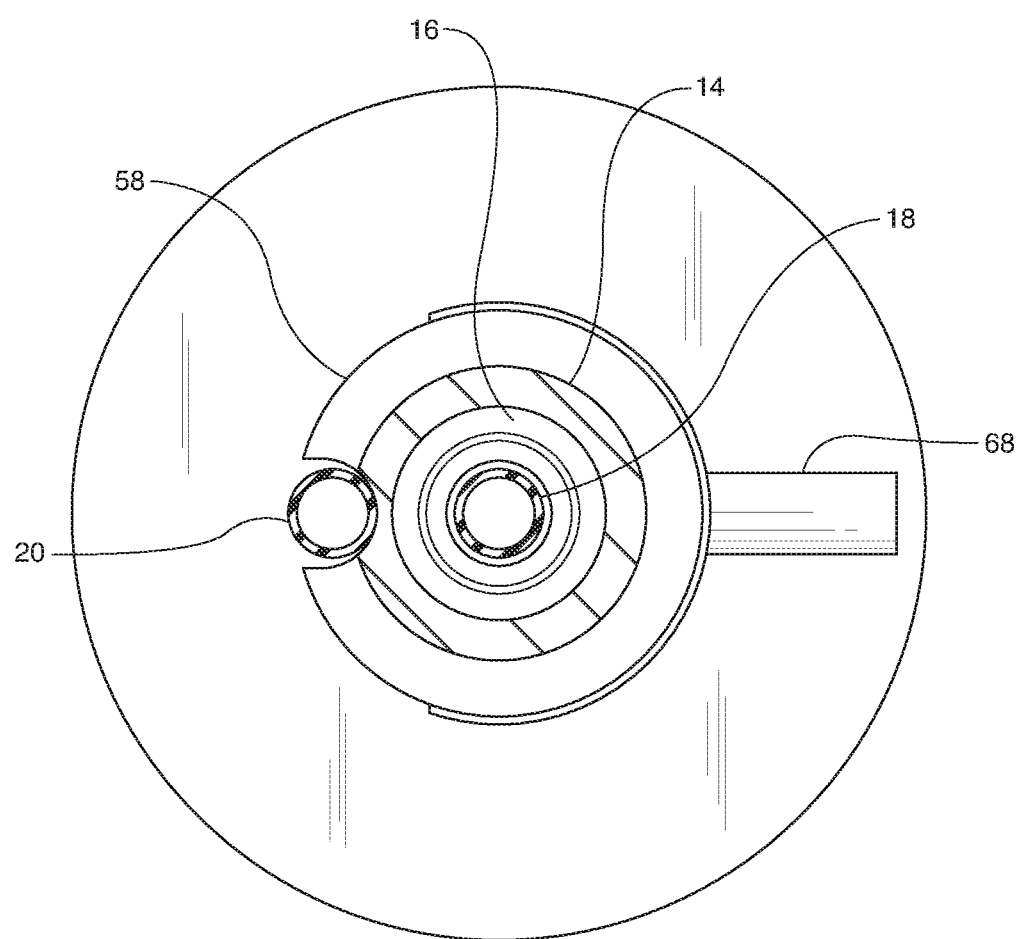
FIG. 8 is a cross-section taken along line 8-8 in FIG. 5.

FIG. 5 and FIG. 8 depict the cutting head 54 in a first position, which may also be referred to as a home position or a neutral position or a first position or a starting position (or something to a similar effect). The focus tube 68 is near the inner surface of pipe 26 and is offset a close distance from the inner surface of pipe surface 26 where the cut line 118 is to be established. Typically the cut line 118 is located in a range from about 4 feet to about 8 feet below ground surface 28. However, other distances are entirely possible. In order to establish the distance that the cut line 118 is below the ground surface depends on the length of the tubular support member 14. Thus, if the cut line 118 needs to be deeper below the ground surface 28, a longer tubular support member 14 can be utilized. Thus, as seen in FIG. 1, symbolic break lines 120 are depicted so as to not limit the length of tubular support member 14 insofar as it may vary depending upon the required depth of the pipe to be cut at cut line 118.

With continued reference to FIG. 5 and FIG. 8, when the cutting head 54 is in the home position, abrasive fluid may be fed through feed line 18 and ultrahigh pressure liquid may be fed through UHP hose 20. The mixture of abrasive fluid and UHP liquid or fluid occurs inside rigid body as depicted in FIG. 4. The combination of the mixed UHP fluid and abrasive material exists the outlet 116 on focus tube 68 and directed towards the inner surface of pipe 26 at cut line 118. As the fluid begins to contact and cut pipe 26 at cut line 118, the motor 12 effectuates the revolution of UHP hose 20 around the longitudinal axis 30. This in turn causes the focus tube 68 to move around the inner surface pipe 26 along cut line 118.

Figure 6A:
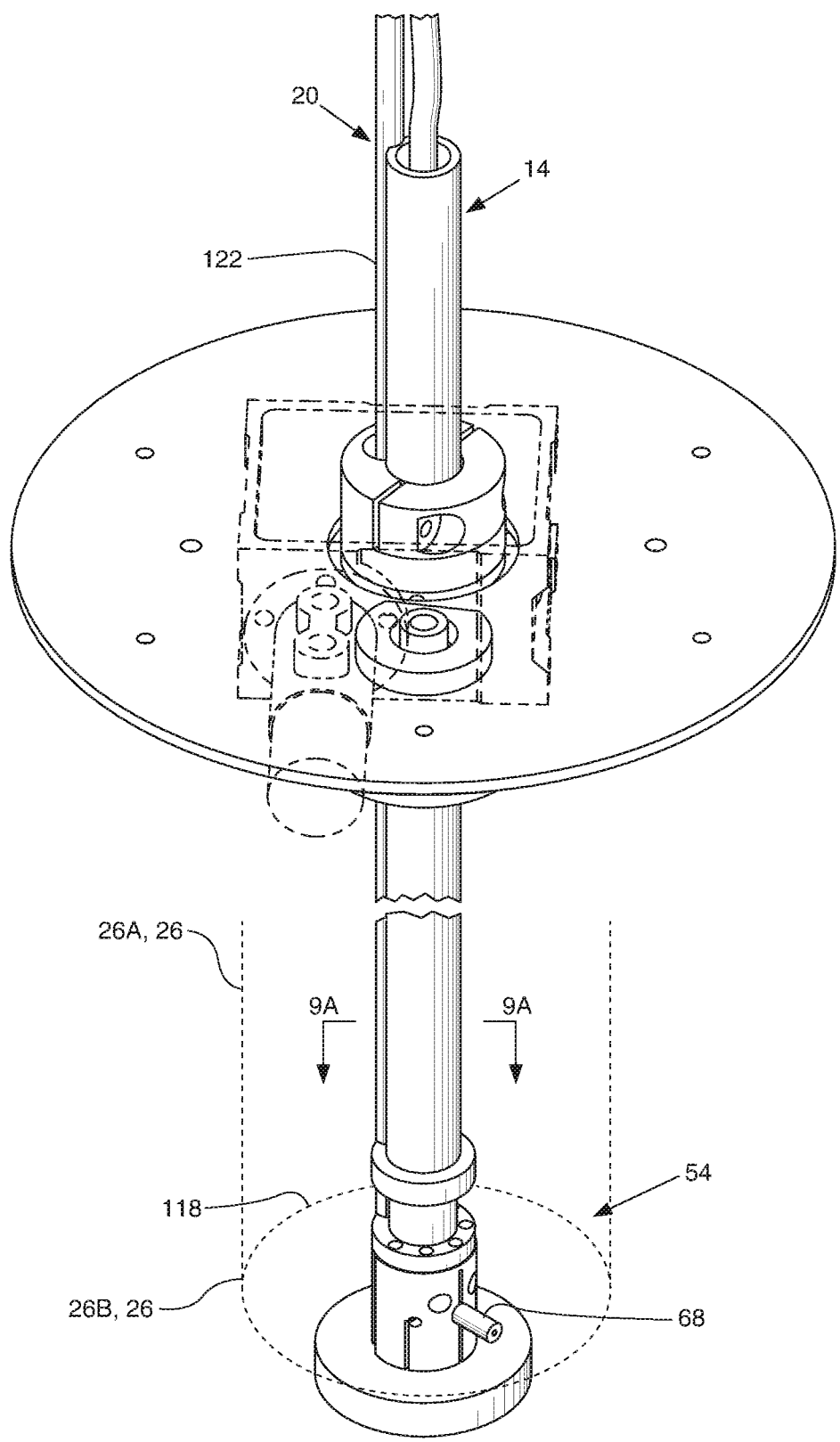
FIG. 6A is an operational perspective view of the first embodiment cutting device in a second position rotated 180° from the first position with a high pressure tube extending along the side of a support tube.
Figure 9A:
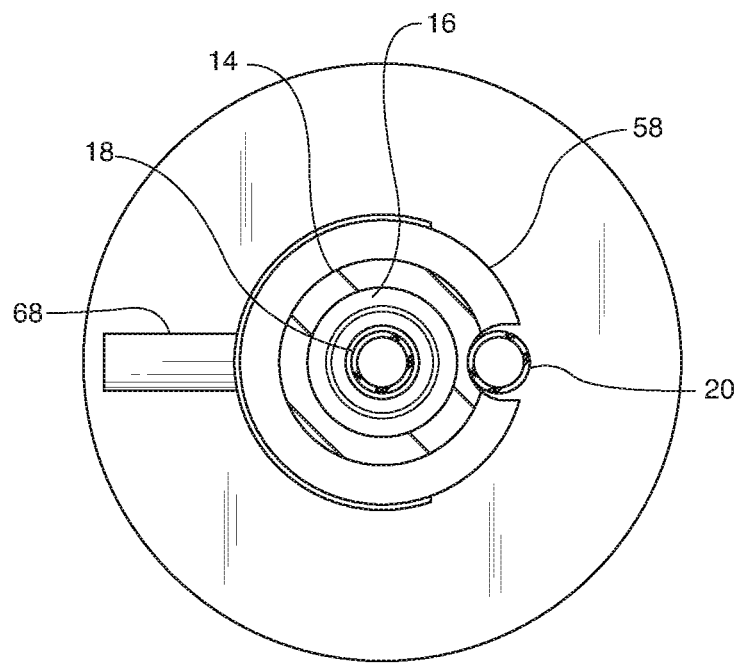
FIG. 9A is a cross-section taken along line 9A-9A in FIG. 6A.

FIG. 6A and FIG. 9A depict a one-half revolution of UHP hose 20. Stated otherwise, the UHP hose 20 has revolved about 180° or half way wrapped around the longitudinal axis 30. In this half-revolution position, cut line 118 extending through pipe 26 would have an approximate radius of curvature of about 180°. Near the half way position, revolution of UHP hose 20 remains substantially straight and elongated relative to tubular support member 14. The fixed collar 42 effectuates the substantial stationary relative position of the hose 20 to the support member 14. During the rotation of tubular support member 14, the UHP hose 20 remains within the channel 56 defined by the outer surface 50 of cylindrical sidewall 48 on tubular support member 14. Thus, in one instance, the arcuate curvature of channel 56 may include large enough sidewalls to stabilize the UHP hose 20 to remain the channel during the revolution of the hose 20 around axis 30 when the device 10A is cutting the tube 26 along cut line 28.

Figure 6B:
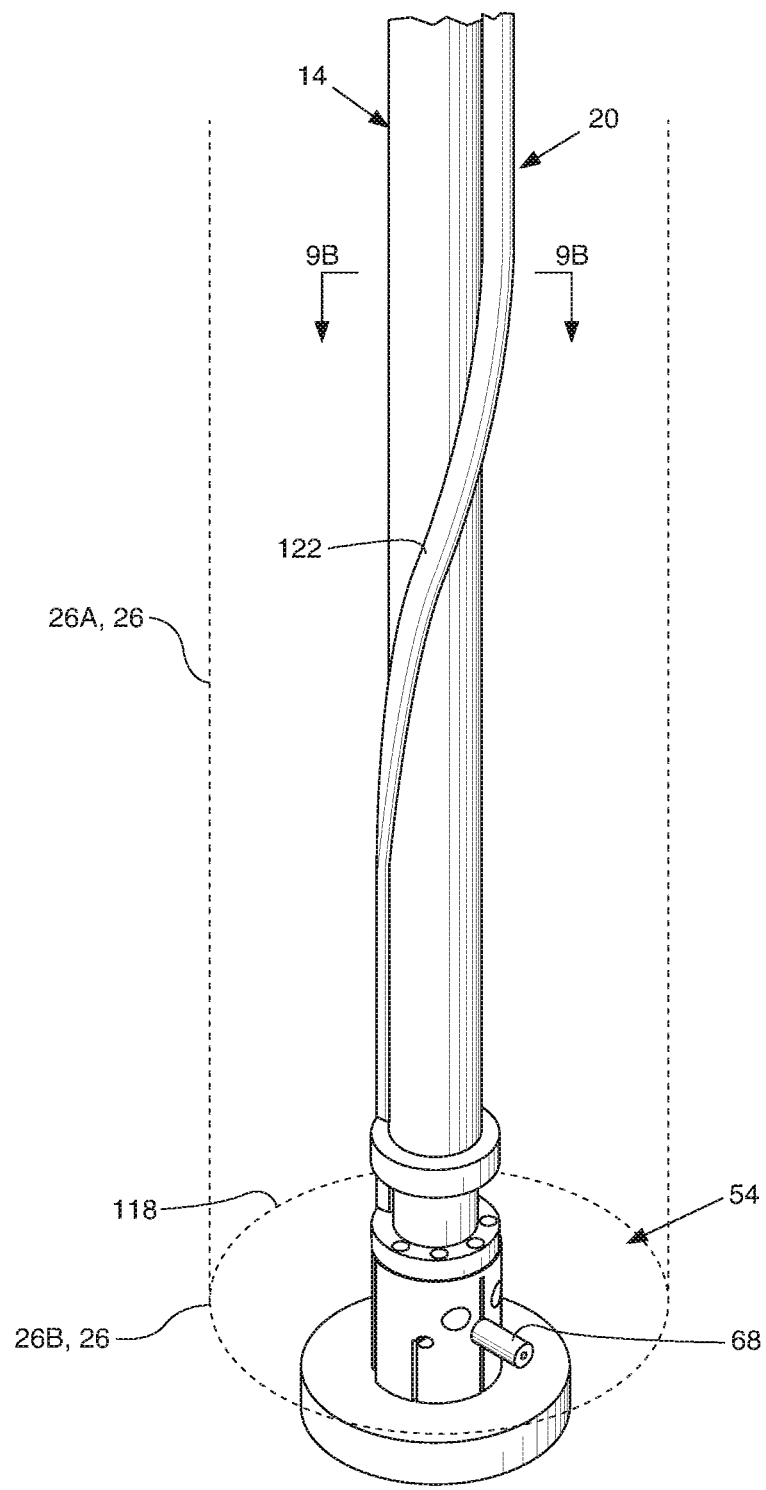
FIG. 6B is an operational perspective view of the first embodiment cutting device in a second position rotated 180° from the first position having a high pressure tube wrapped around a portion of device (i.e., the support member).
Figure 9B:
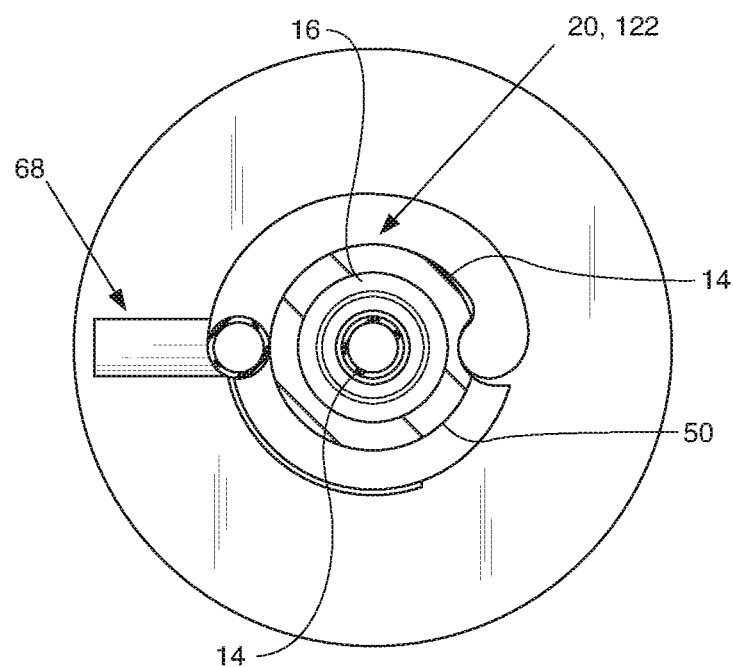
FIG. 9B is a cross-section taken along line 9B-9B in FIG. 6B.

FIG. 6B and FIG. 9B depict an alternative version that may include different components but would also operate within the scope of the present disclosure utilizing a one-half revolution of UHP hose 20. Stated otherwise, in this alternative version the UHP hose 20 has revolved about 180° to be partially or half way wrapped around the tubular support member 14. In this half-wrapped position, cut line 118 extending through pipe 26 would have an approximate radius of curvature of about 180°. Near the half way position, revolution of UHP hose 20 approximates 180° about the outer surface of tubular support member 14. During the revolution of UHP hose 20, the UHP hose 20 may exit the channel 56 defined by the outer surface 50 of cylindrical sidewall 48 on tubular support member 14. Thus, in this instance, the arcuate curvature of channel 56 may include shallow sidewalls to encourage and enable the UHP hose 20 to leave the channel during the revolution of the same when the device 10A is cutting the tube 26 along cut line 28. More particularly shown at FIG. 9, the one-half revolution or the one-half wrap of UHP hose 20 around the outer surface 50 of cylindrical sidewall 48 is depicted generally at 122.

Figure 7A:
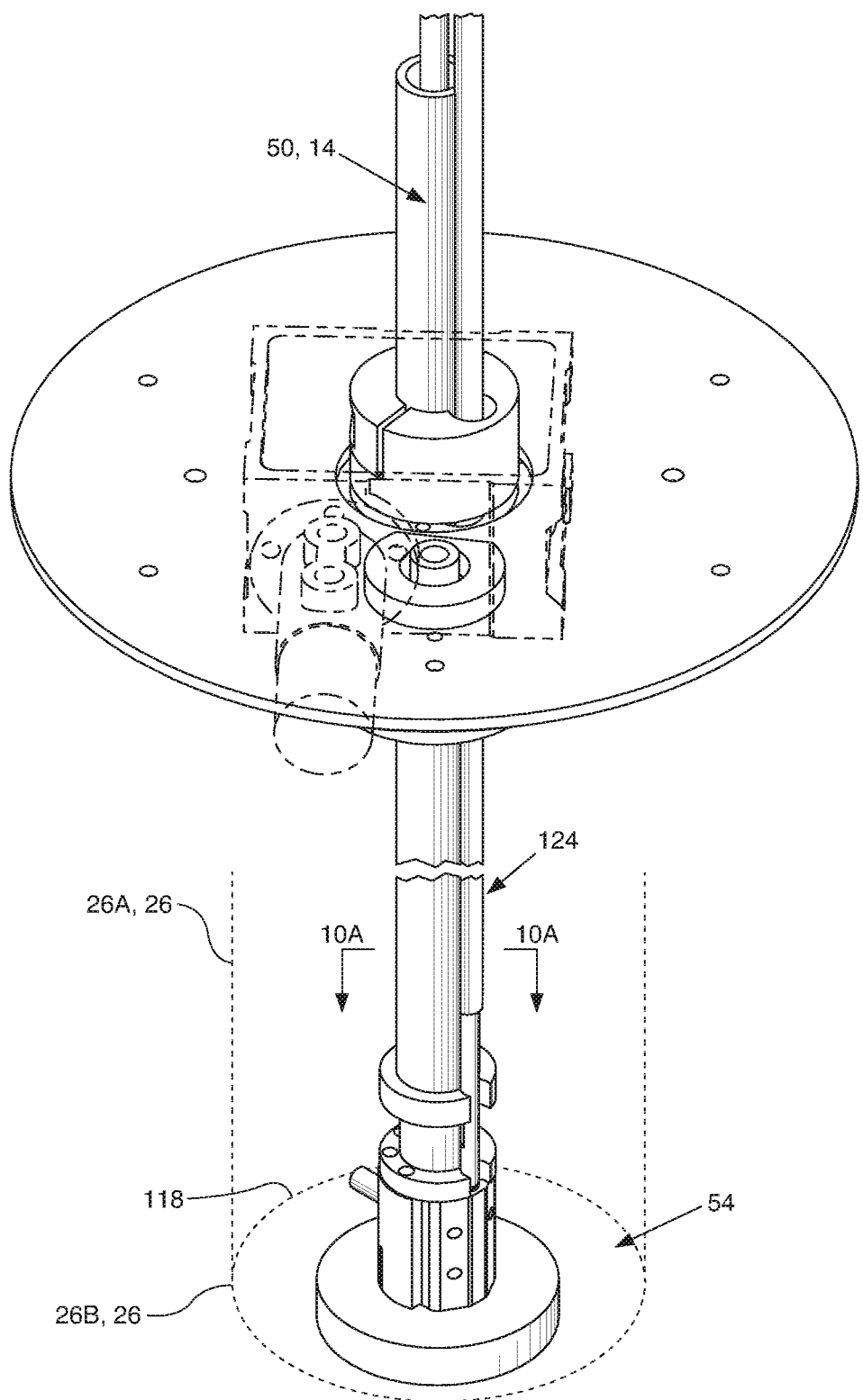
FIG. 7A is an operational perspective view of the first embodiment cutting device having been rotated 360° with the high pressure tube extending along the side of a support member.
Figure 10A:
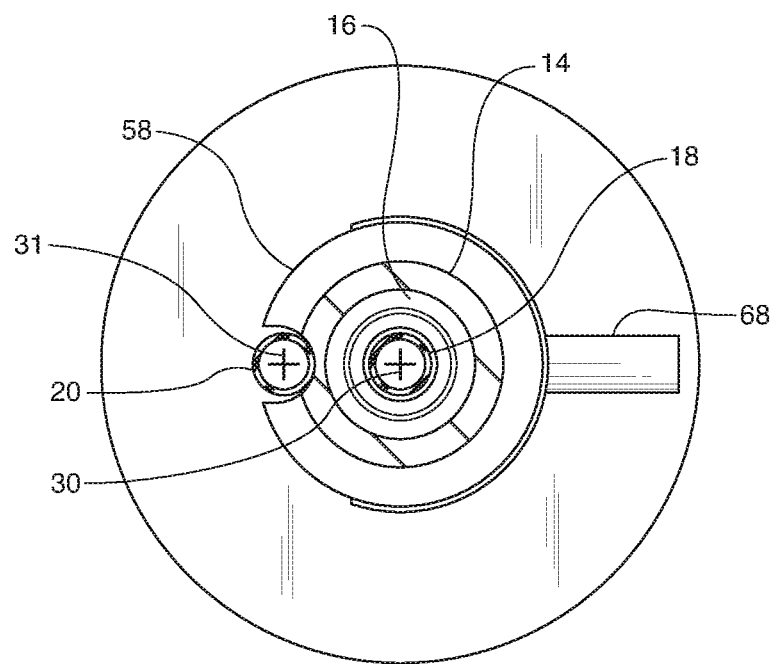
FIG. 10A is a cross-section taken along line 10A-10A in FIG. 7A.

As depicted in FIG. 7A and FIG. 10A, the motor 12 may continue to revolve the UHP hose 20 around longitudinal axis 30 by remaining in a fixed relative position to tubular support member 14 so as to complete a 360° revolution of the UHP hose 20 around axis 30 while tubular support member 14 is rotating. This effectuates a full 360° cut of cut line 118 of pipe 26. When the full revolution 124 of hose 20 has occurred around the longitudinal axis 30 carried by tubular support member 14, still no portion of the UHP hose 20 intersects the longitudinal axis 30 of device 10A.

Figure 7B:
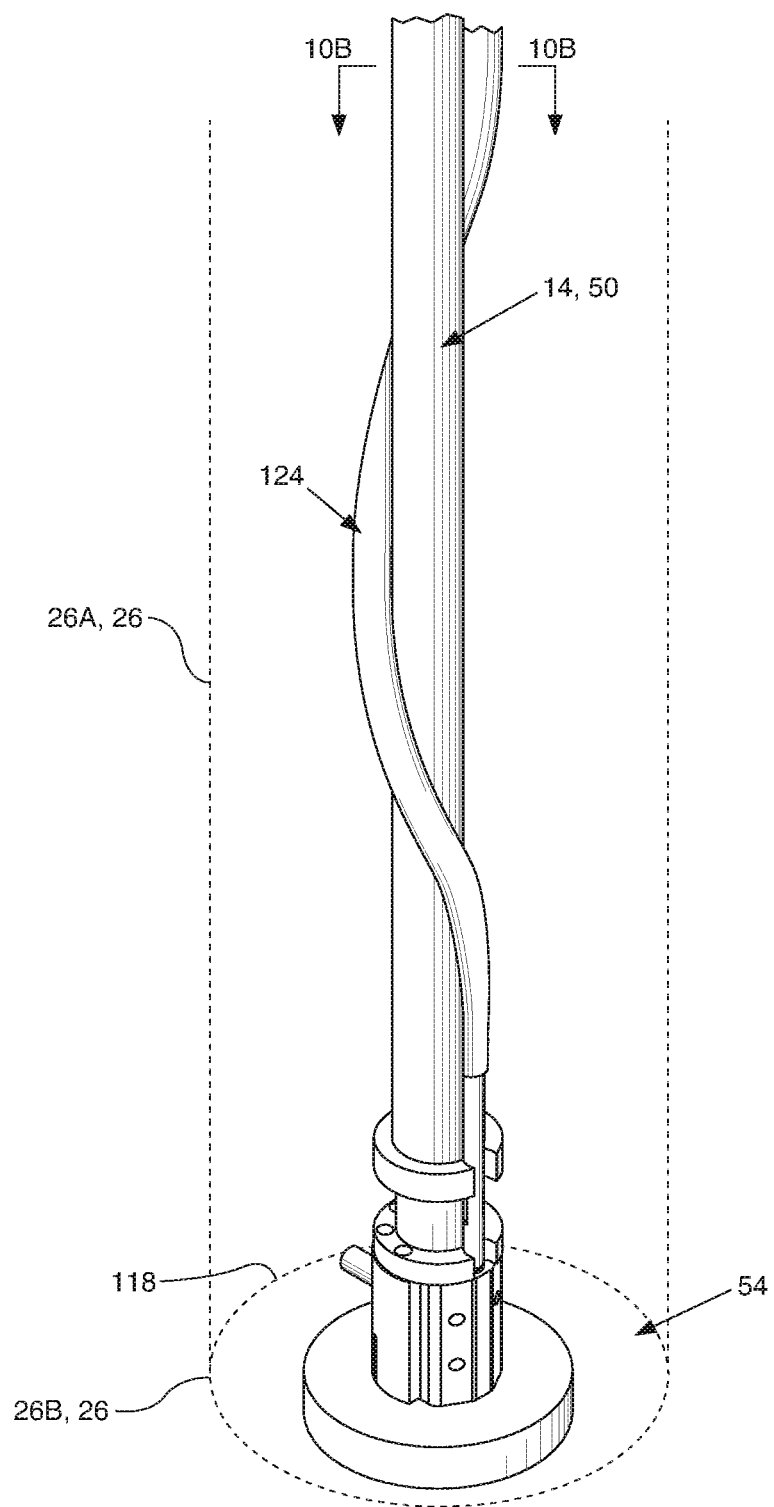
FIG. 7B is an operational perspective view of the first embodiment cutting device having been rotated 360° with the high pressure tube wrapped around the support member.
Figure 10B:
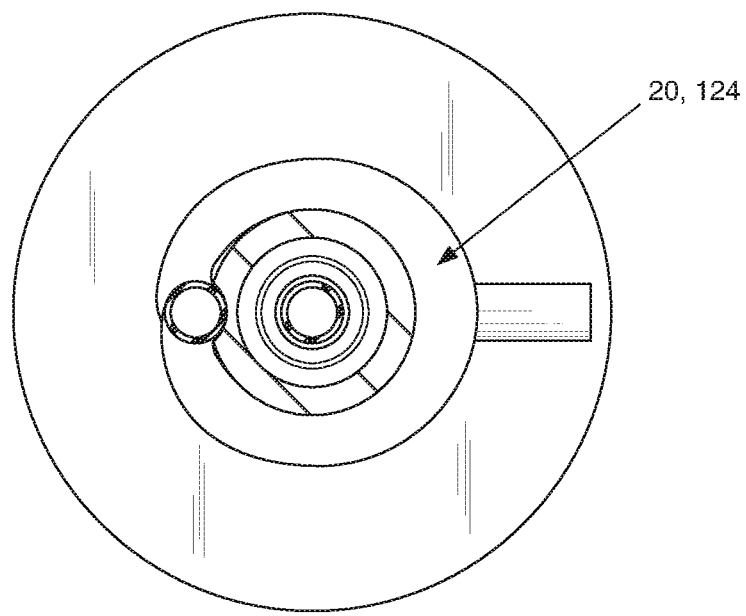
FIG. 10B is a cross-section taken along line 10B-10B in FIG. 7B.

As depicted in FIG. 7B and FIG. 10B (which correspond to the alternative version of FIG. 6B and FIG. 96), the motor 12 may continue to revolve the UHP hose 20 around the outer surface 50 of tubular support member 14 so as to complete a 360° revolution of the UHP hose 20 around tubular support member 14. This effectuates a full 360° cut of cut line 118 of pipe 26. The 360° wrap or the full revolution wrap of hose 20 is indicated generally at 124. When the full revolution 124 of hose 20 has wrapped around the outer surface 50 of tubular support member 14, still no portion of the UHP hose 20 intersects the longitudinal axis 30 of device 10A.

With continued reference to FIG. 5-FIG. 10, a method of use for the cutting device 10A may include a method of cutting a pipe, such as pipe 26, comprising the steps of inserting a distal and (the second end 24) of a pipe cutting device, such as device 10A, 10B, into a pipe 26 wherein the cutting head 54 is located near the distal end 24. Thereafter revolving the UHP tube or hose 20 around the longitudinal axis 30 while remaining exterior to outer surface 50 of a tubular support member 14 carrying the cutting head while the cutting head moves about a longitudinal axis 30 of the device 10A, 10B wherein the UHP hose 20 does not rotate about axis 30. The step of revolving the UHP hose 20 around the outer surface of the tubular support member 14 occurs simultaneous to the pressurized fluid flowing along the UHP hose 20 parallel to longitudinal axis 30. Stated otherwise, as the UHP hose 20 revolves around axis 30, no portion of the fluid flow moving therethrough is coaxial to longitudinal axis 30. The fluid exits UHP hose 20 near the second end 76 and enters nibble 62. Thereafter, the UHP fluid moves through the vertically aligned bore of nipple 62 in a manner that is parallel and offset to longitudinal axis 30. The UHP fluid then enters bore 110 which is vertically aligned and coaxial with that of nipple 62. The UHP fluid exits the bore 110 in cutting head 54 through a transversely aligned outlet 112 that is offset from longitudinal axis 30. The UHP fluid exits the outlet 112 and crosses the longitudinal axis in a perpendicular manner. Near longitudinal axis 30, the abrasive fluid flowing through feedline 18 is mixed within the bore 114 that is transversely aligned perpendicular to axis 30. Thereafter, the combined and mixed abrasive fluid and ultra-high pressure fluid exits bore 114 at outlet 116 and is directed towards the inner surface of pipe 26 which is intended to be cut along cut line 118. The ultra-high pressure fluid and abrasive fluid mixture is able to cut through the pipe regardless of the pipe material construction, which is typical concrete or metal.

With continued reference to the method of operation of device 10A (as well as device 10B), a method of operating the pipe cutting device 10A, 10B may include inserting a cutting head 54 (or cutting head 126 infra) carried by an elongated support member 14 into the pipe 26; revolving the UHP hose 20 around the elongated support member 14 while UHP fluid moves through the UHP hose 20; and cutting the pipe 26 with UHP fluid exiting the cutting head, such as the focus tube. This embodiment or another embodiment of the method may provide wherein revolving the UHP hose 20 around the elongated support member 14 further comprises positioning the UHP hose 20 exterior to the outer surface 50 of the elongated support member 14. This embodiment or another embodiment may provide wherein revolving the UHP hose 20 around the elongated support member 14 further comprises: positioning the UHP hose 20 in the channel 56 formed by the outer surface 50 of the elongated support member 14 when the cutting device is in a neutral or home position; and effecting the UHP hose 20 to exit the channel 56 as the UHP hose revolves around the outer surface 50 of the elongated support member 14. Alternatively, an embodiment may provide effecting the UHP hose 20 to remain in the channel 56 as the UHP hose 20 revolves around the longitudinal axis 30 exterior to outer surface 50 of the elongated support member 14. This embodiment or another embodiment may provide wherein revolving the UHP hose 20 around the elongated support member 14 further comprises completing at least a one-half revolution of the UHP hose 20 around the longitudinal axis 30 exterior to the elongated support member 14 in a first direction. This embodiment or another embodiment may provide wherein revolving the UHP hose exterior to the tubular support member further comprises completing at least one full revolution of the UHP hose 20 around the longitudinal axis 30 exterior to elongated support member 14 in the first direction, for example the clockwise direction. This embodiment or another embodiment may provide wherein subsequent to completing the one-half revolution of the UHP hose 20 around the elongated support member in the first direction, further includes completing a second one-half revolution of the UHP hose 20 around the axis 30 exterior to the elongated support member 14 in an opposite second direction, such as counter-clockwise. This embodiment or another embodiment may provide flowing UHP fluid offset parallel to a central longitudinal axis 30. This embodiment or another embodiment may provide preventing UHP fluid from ever flowing coaxial with the longitudinal axis 30. This embodiment or another embodiment may provide moving the UHP hose 20 eccentrically during revolution around the longitudinal axis 30.

The method may additionally provide revolving the UHP hose 20 from a home first position to a wrapped second position, wherein the UHP hose does not rotate about the longitudinal axis 30 during the revolution thereof around the longitudinal axis 30 from the first position to the second position. This embodiment or another embodiment may provide coupling an end of the UHP hose 20 with a first inlet of the cutting head offset from the longitudinal axis. This embodiment or another embodiment may provide feeding an abrasive substance centrally along the longitudinal axis in an abrasive feed line 18. This embodiment or another embodiment may provide wherein the elongated member 14 is tubular or cylindrically hollow in shape including an inner surface 52 defining the bore 16, and the abrasive feed line 18 is disposed within the bore having a narrower diameter than the bore. This embodiment or another embodiment may provide mixing the abrasive substance with UHP fluid near a focus tube on the cutting head to create a cutting mixture; directing the cutting mixture towards an inner surface of the pipe 26 at cut line 108. This embodiment or another embodiment may provide wherein the first inlet on the cutting device receiving UHP fluid therethrough is spaced from the longitudinal axis, and the second inlet receiving abrasive therethrough is co-axial with the longitudinal axis.

For the methods of use detailed in FIG. 6B and FIG. 9B (as well as FIG. 16B and FIG. 19B introduced below), this embodiment or another embodiment may provide wrapping the UHP hose at least 180° around the outer surface 50 of the elongated member 14. This embodiment or another embodiment may provide wrapping the UHP hose about 360° around the outer surface of the elongated member in the wrapped second position. With continued reference to this version utilizing the wrapping of hose 20, subsequent to the steps of cutting pipe 26, entire device 10A may be removed from pipe 26. After removing the device 10A, which is still in the fully wrapped position 124, the device 10A may be unwound so as to return the UHP hose 20 back to the home position. Alternatively, the unwinding of UHP hose 20 from the wrapped position 124 back to the home position may occur within the tube 26 prior to the removable of device 10A from tube 26. In this instance, after the cut has been made, the device 10A may be unwound so as to return to the home position and the device 10A removed from the pipe 26 in the home position.

For the version of the device depicted in FIG. 6A and FIG. 9A, subsequent to the steps of cutting pipe 26, entire device 10A may be removed from pipe 26. The hose 20 will remain inside channel 56 during the removal of the device from pipe 26. After the device 10A has been removed from the pipe 26, a machine may be positioned above the ground surface near the top end of the first section 26A of pipe 26 and can be rigidly connected thereto. Connection of the machine (not shown) to pipe 26A is used to extract the top section 26A from the ground. In one scenario, there is no need to dig into the ground near the surrounding areas of the top section 26A of pipe 26. However, it is contemplated that to assist the removal of top section 26A, an excavator or shovel may be used to dig away portions of the earth or the ground to ease the removal of top section 26A. The bottom section 26B which remains in the ground may be capped to completely seal off pipe 26 below the ground surface. Capping of lower section 26B of pipe 26 may be done with a plug or other cap device that effectuates a permanent seal therewith. Permanent seal of the cap to the lower section 26B may be welded or permanently adhered or connected in other known manners. Thereafter the space above the capped section of pipe 26B, which was previously occupied by the top section 26A, may be backfilled with earthen material. The ground may be leveled so as to leave no visible signs of the underground capped section of pipe 26B above the ground.

Figure 11:
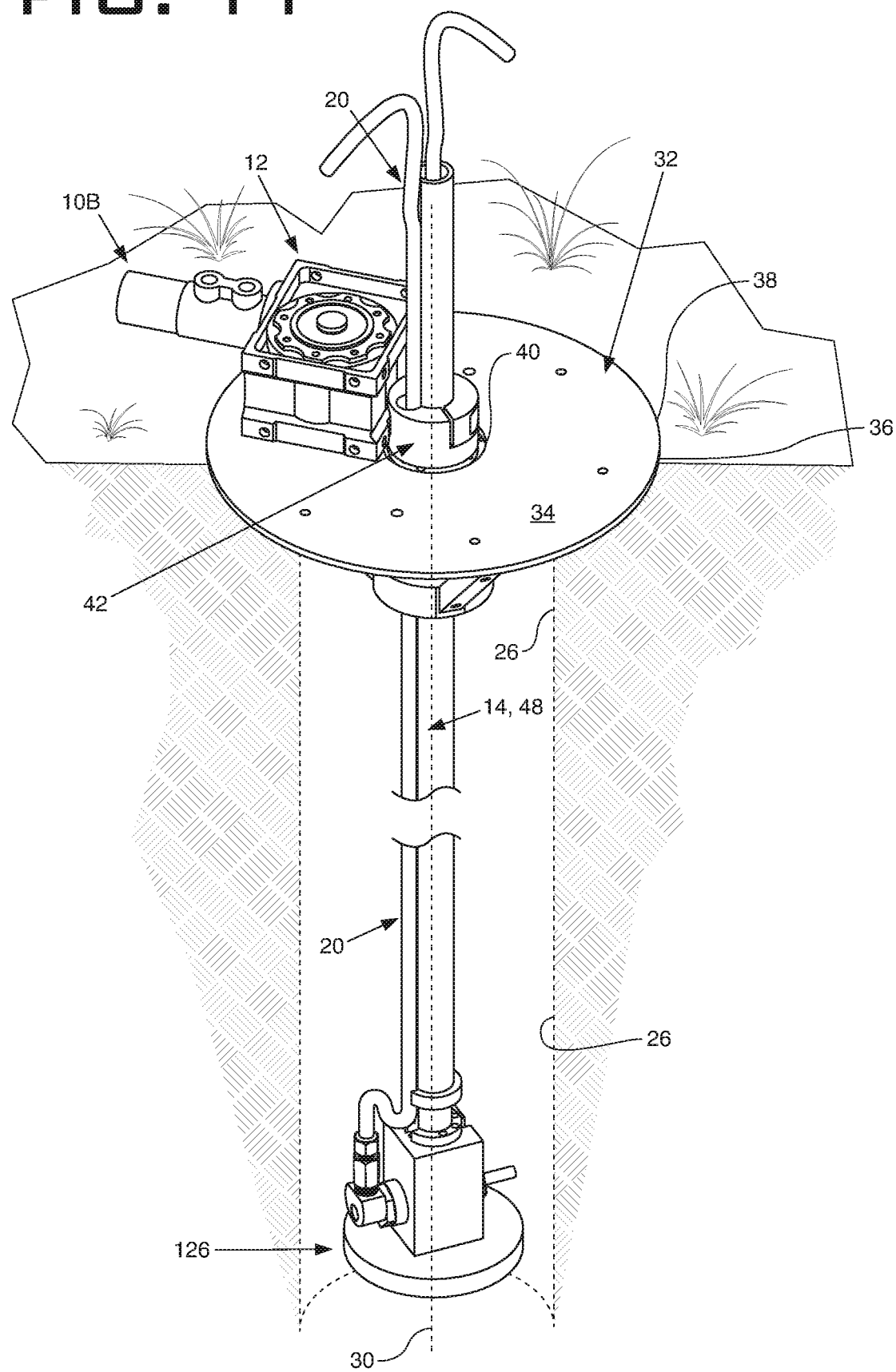
FIG. 11 is a diagrammatic perspective view of a pipe cutting device in accordance with a second embodiment of the present disclosure.

FIG. 11 depicts the second embodiment of cutting device 10B which includes some similar components to that of cutting device 10A wherein the similar components are identified by similar reference numerals and are not repeated herein for brevity. Cutting device 10B differs from cutting device 10A in that it includes a differing cutting head 126.

Figure 12:
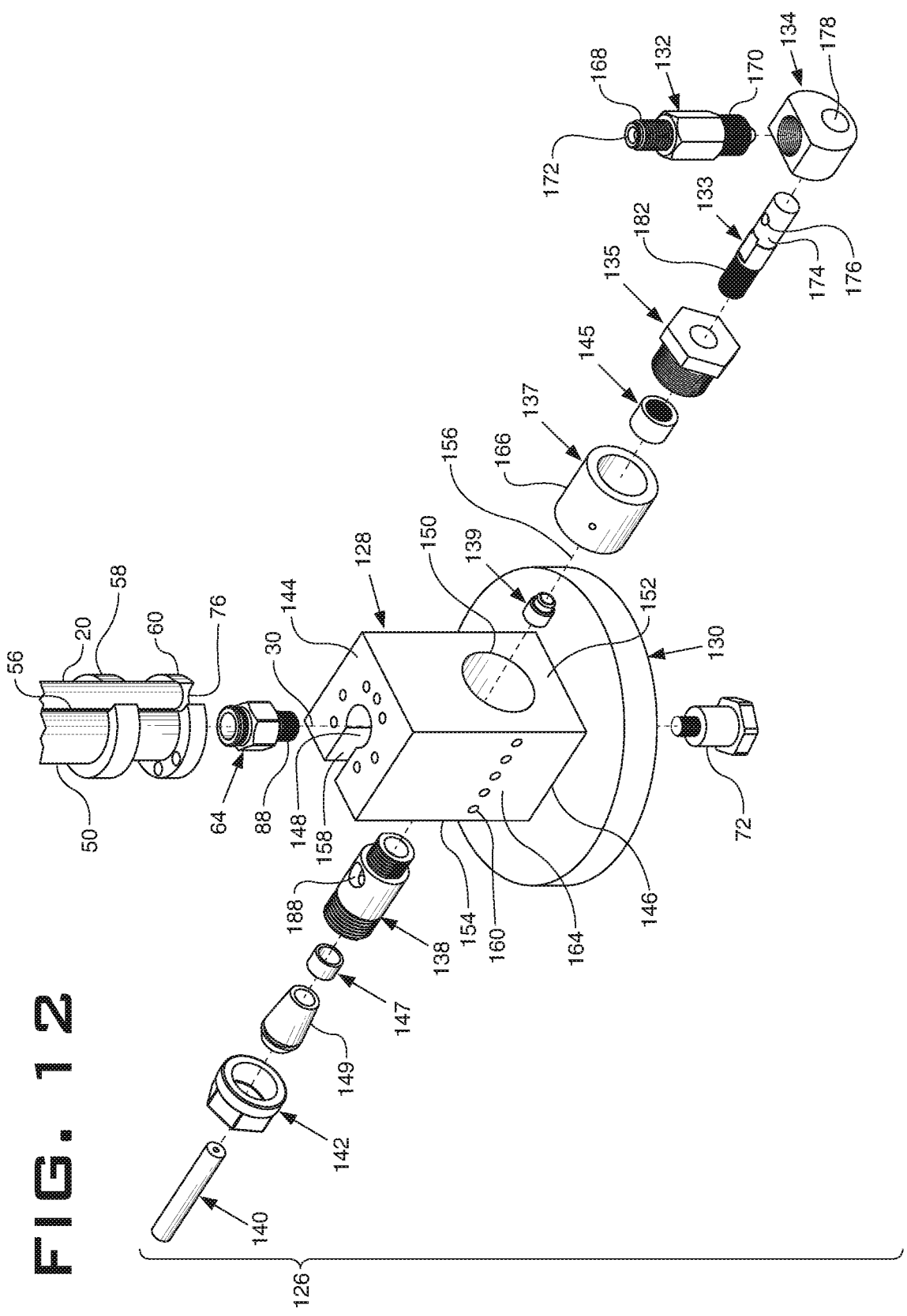
FIG. 12 is an exploded perspective view of a cutter head on the second embodiment cutting device.
Figure 13:
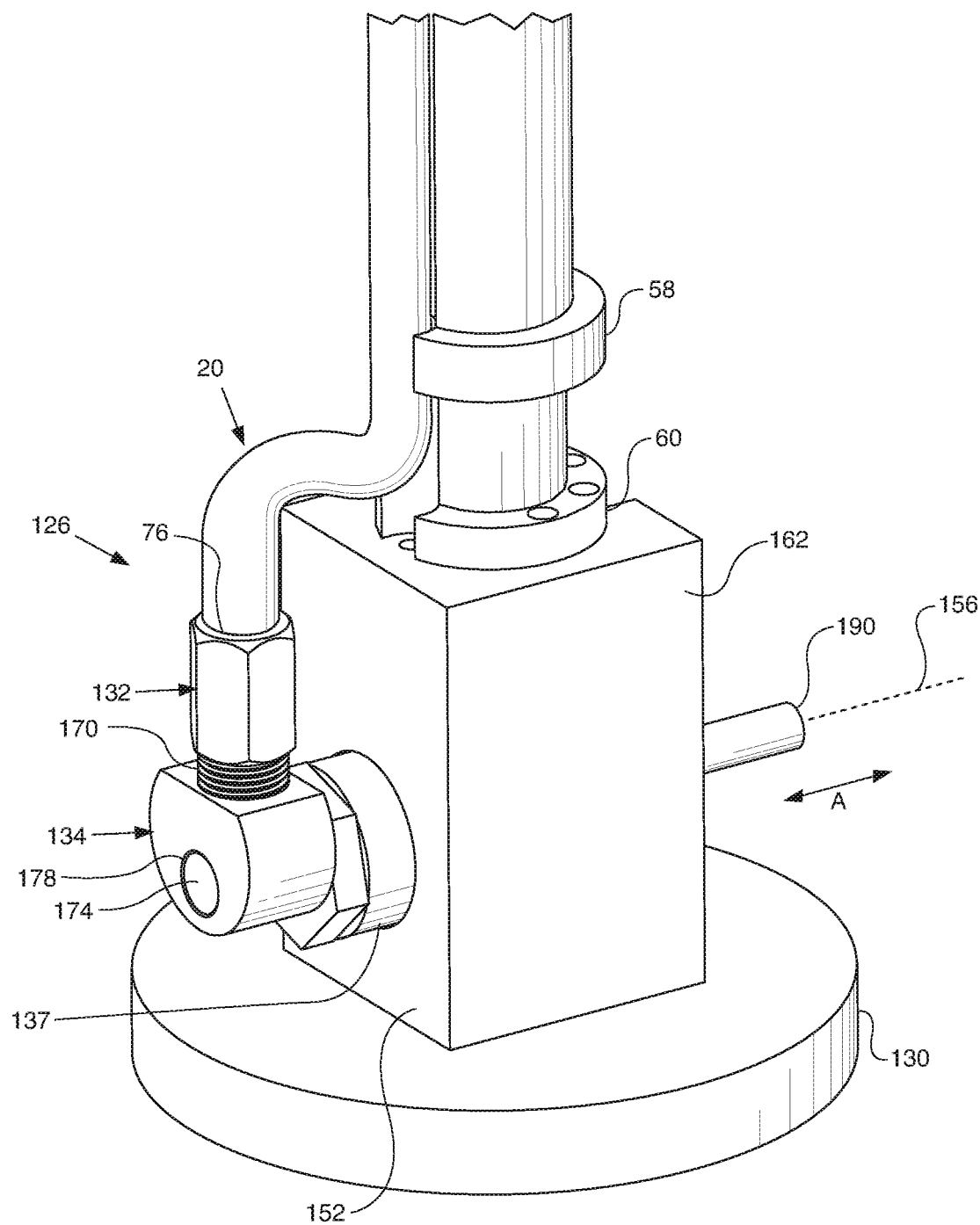
FIG. 13 is an assembled enlarged perspective view of the cutting head on the second embodiment cutting device.
Figure 14:
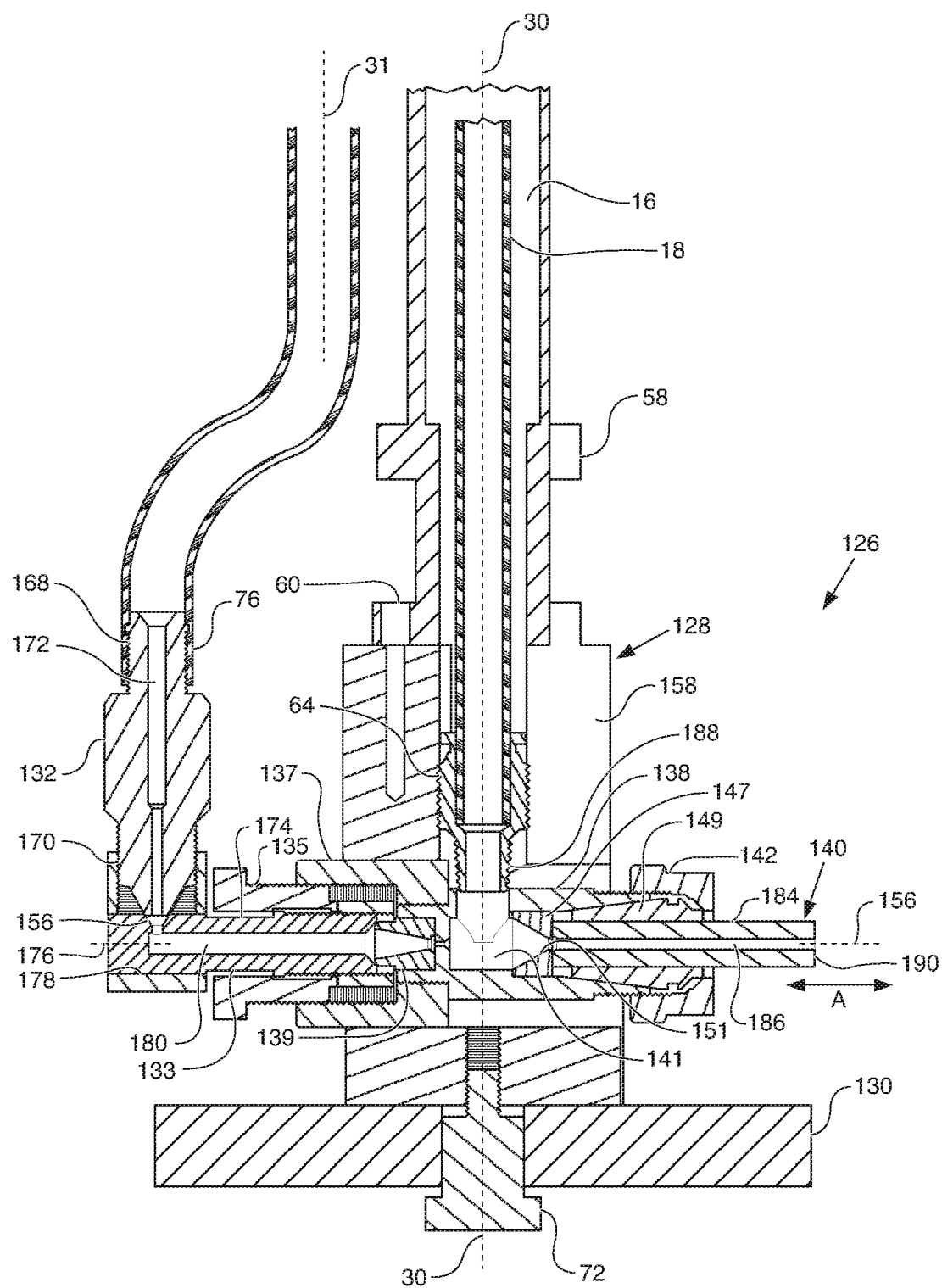
FIG. 14 is an elevational cross-section view of the cutting head on the second embodiment cutting device.

As depicted in FIG. 12, FIG. 13, and FIG. 14, cutting head 126 of cutting device 10B includes a generally rectangular rigid body 128, a lower annular plate 130, a threaded couple 132, an elbow 134, a focus tube 133, a second threaded couple 138, an extension tube 140, and a fastener 142.

Rectangular rigid body 128 includes an upwardly facing top surface 144 opposite a downwardly facing bottom surface 146. Rectangular rigid body 128 includes four sidewalls extending from the first surface 144 to the second surface 146 at right angles thereto and at right angles relative to each other. Body 128 defines a first longitudinally extending bore 148 which is coaxial with longitudinal axis 30. In one particular embodiment, bore 148 is centered relative to the first surface 144 and the second surface 146 such that the sidewalls of rigid body 128 are all equal relative their longitudinal axis 30. The longitudinal bore 148 extends fully through rigid body 128 from the first surface 144 to the second surface 146. A transverse second bore 150 is defined by rigid body 128 and extends from a first sidewall 152 fully transverse through rigid body 128 to a second sidewall 154. Transverse second bore 150 has a diameter that is larger than the diameter of the longitudinally extending first bore 148. The transverse second bore 150 is centered along a transverse axis 156 perpendicularly intersects longitudinal axis 30 within rigid body 128. Rigid body 128 may further define a slot 158 in open communication with the longitudinal first bore 148 and the transverse second bore 150 such that the slot 158 interrupts the first sidewall 152 and interrupts the top surface 144 of rigid body 128.

Rigid body 128 may further define a plurality of laterally extending bores 160 which are formed as through holes that laterally extend through a third sidewall 162 rigid body 128, wherein the third sidewall 162 is parallel and offset from a fourth sidewall 164. The third sidewall 162 and the fourth sidewall 164 are perpendicularly intersect and form corner unions with the first sidewall 152 and the second sidewall 154. The lateral bores 160 are configured to receive a fastener, such as a screw, therethrough which engages in a frictional interference fit an outer surface of a collar 137 operatively connected with tube 133. When assembled, the collar 136 slideably received within a portion of transverse second bore 150. This enables the focus tube to be slideably adjusted along transverse axis 156 to provide a desired offset from the inner surface of pipe 26 to be cut by abrasive fluid and ultrahigh pressure fluid moving through focus tube and the extension tube 140.

With continued reference to FIG. 12, FIG. 13, and FIG. 14, an upper threaded end 168 of first couple 132 is threadably connected with lower end 76 of UHP hose 20. Lower end 170 of couple 132 is threadably connected with elbow 134. First couple 132 defines a bore therethrough for fluid from UHP 20 to move therethrough when the couple 132 is threadably connected with lower end 76. The bore 172 of couple 132 extends from first end 168 to threaded second end 170.

Tube 133 is oriented transversely and includes a cylindrical body 174 defining an opening 176 aligned with the bore 172 of couple 132 within the elbow 134. Elbow 134 defines a transversely extending bore 178 that receives the cylindrical body 174 of tube 133 therethrough. When the cylindrical body 174 of tube 133 is disposed within the transverse bore 178 of elbow 134, the opening 176 is positioned vertically below the longitudinally extending bore 172 of couple 132. An open fluid communication is established through the bore 172 such that ultrahigh pressure liquid or fluid may flow from hose 20 through the couple 132 into the bore 180 defined by cylindrical tube 174 of focus tube 133. A threaded forward end 182 on cylindrical body 174 is configured to mate with a gland nut 135 and collar 137 and an additional coupler 145. An insert 139 has a transversely tapered opening that is in fluid communication with the end 184 of tube 133. Insert 139 enables high pressure fluid to flow into a venture mixing chamber 141.

Extension tube 140 is oriented transversely and includes a cylindrical body 184 that extends through second couple 138 along the transverse second axis 156. The extension tube 140 is aligned with cylindrical body 174 of tube 133 along second axis 156 and is retained in place by fastener 142 within the second bore 150 of rigid body 128. The cylindrical body 184 of extension tube 140 defines a bore 186 and is in open fluid communication with bore 180 (FIG. 14) of focus tube 133 via the venture mixing chamber 141. The open fluid communication of bore 186 with bore 180 effectuates the transition of UHP fluid from focus tube 133 to the extension tube 140 while drawing abrasive through line 18 which is also in fluid communication with mixing chamber 141. More particularly, fluid flows through bore 180 defined by cylindrical body 174 through mixing chamber 141 where it draws abrasive out from line 18 and the mixture flows through bore 186 defined by cylindrical body 184. Similar to the previous embodiment, within cutting device 10B, the ultrahigh pressure fluid is never flowing along longitudinal axis 30, rather when the ultrahigh pressure fluid is within UHP hose 20, it is offset parallel to axis 30. After passing through the elbow 134, the UHP fluid only intersects longitudinal axis 30 in a perpendicular manner and is never coaxial therewith. The abrasive fluid moving along abrasive line 18 extends centrally in a coaxial manner along longitudinal axis 30 and is mixed with UHP fluid inside rigid body 128 in chamber 141 by moving through a hole 188 formed in second couple 138. The lower end 88 of couple 64 connects with rigid body 128 to create an open fluid communication of the couple 64 with the hole 188 of second couple 138 through bore 148.

While not shown, it is entirely possible for a second annular or circular plate (in addition to plate 130) to be attached to the rigid body 128 above the focus tube 133. In one instance, the second plate connects with a bracket located near the bottom end of the tubular support member 14. Both annular plates (130, and the second annular plate) cooperate to center the device within the pipe to be cut, which is helpful in the event the tubular support member 14 ever is bent.

FIG. 14 depicts a mixing bowl 147 located within couple 138 and held in position by a tapered member 149 defining a transversely aligned bore that receives tube 140 therethrough. The mixing bowl 147 is in direct fluid communication with venture chamber 141. Mixing bowl includes a tapered wall 151 that narrows to an opening for moving the mixture of UHP fluid and abrasive through tube 140.

When the tube 133 and the extension tube 140 are connected together, they may move transversely along the axis 156 and may be secured in place by fasteners extending laterally through bores 160 on rigid body 128. This effectuates and enables an operator or user to vary the offset distance of the end of the extension tube 140 relative to the inner surface of the pipe 26 to be cut. Thus, if the pipe has a narrower diameter, the focus tube and extension tube 140 would be adjusted to move the outer end 190 of extension tube 140. Alternatively, if the pipe 26 to be cut has a larger diameter, the outer end 190 of extension tube 140 would be moved in a direction opposite that as previously described. The directional sliding movement of the outer end 190 is represented by movement arrows A in FIG. 13. This indicates that the outer end 190 may slide along transverse second axis 156.

Figure 15:
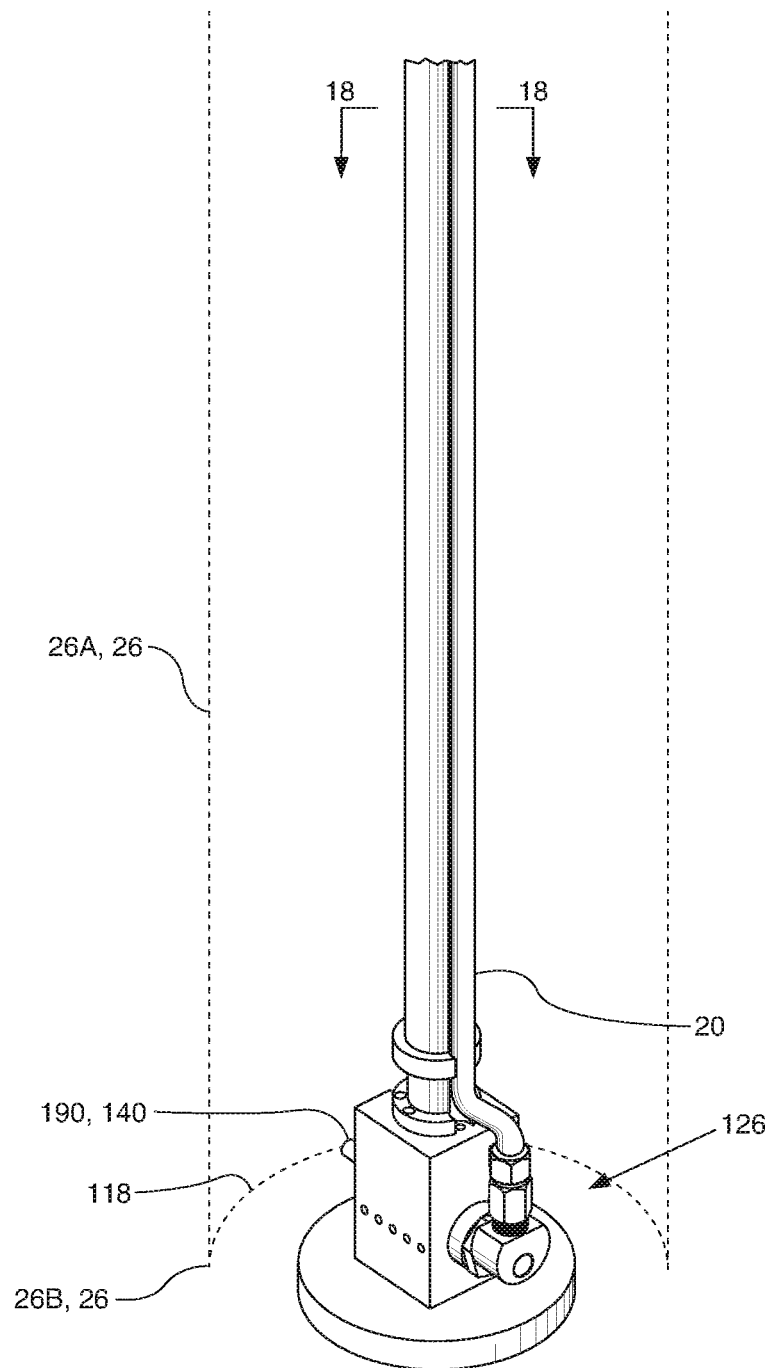
FIG. 15 is an operational perspective view of the second embodiment cutting device located within a pipe in a first position.
Figure 17A:
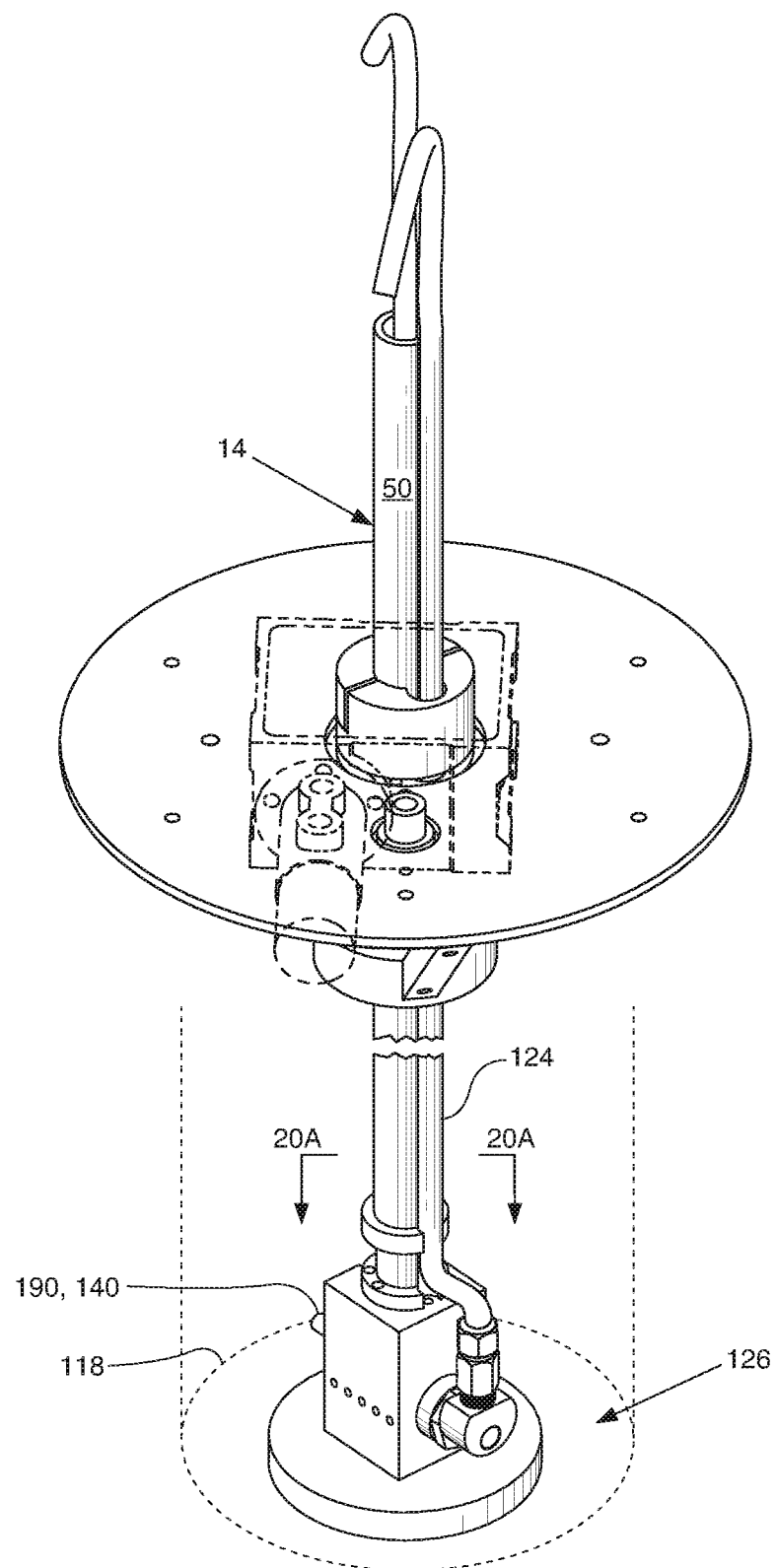
FIG. 17A is an operational perspective view of the second embodiment cutting device wherein completing 360° revolution.
Figure 17B:
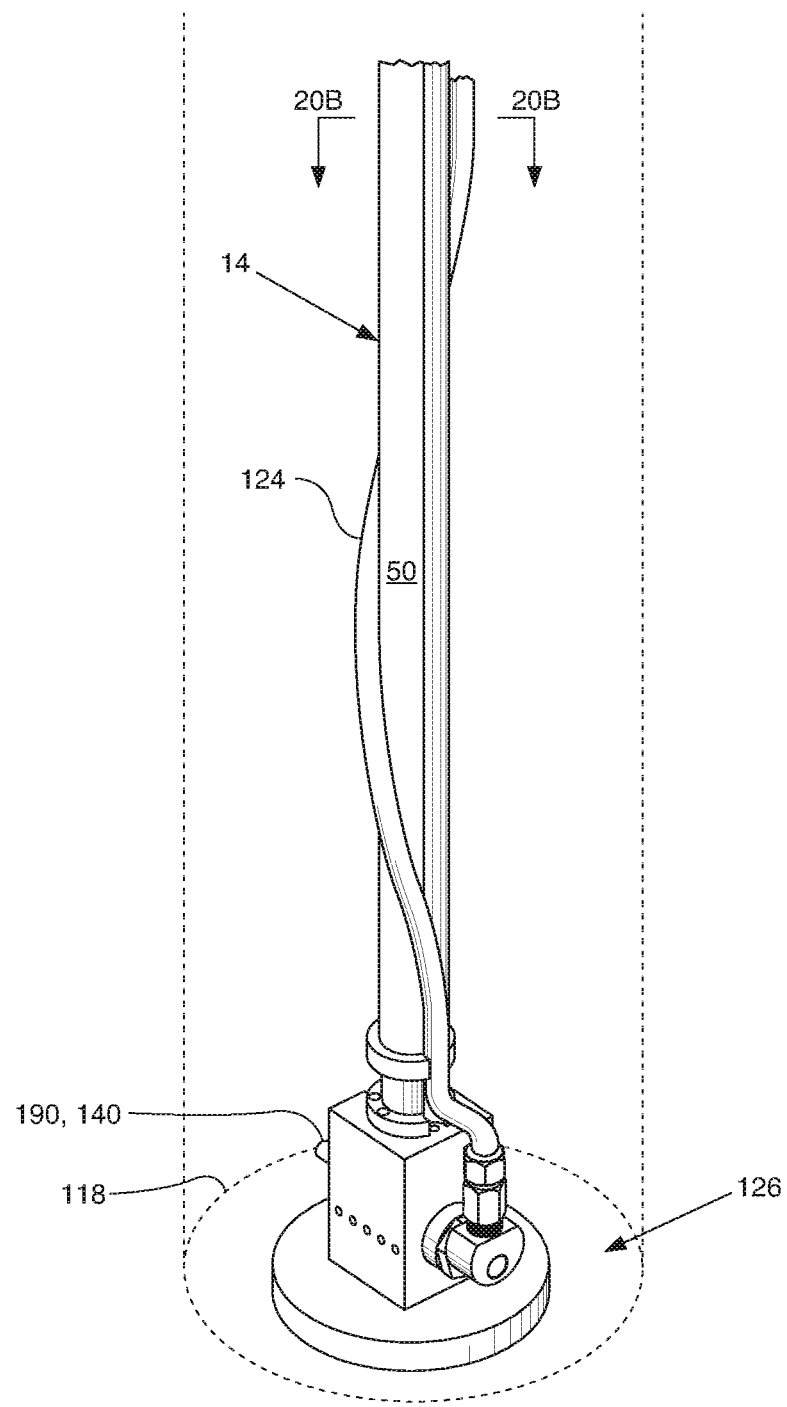
FIG. 17B is an operational perspective view of the second embodiment implementing the option from FIG. 16B wherein the high pressure hose or tube has been wrapped a full revolution while the cutting device completes a 360° revolution.
Figure 18:
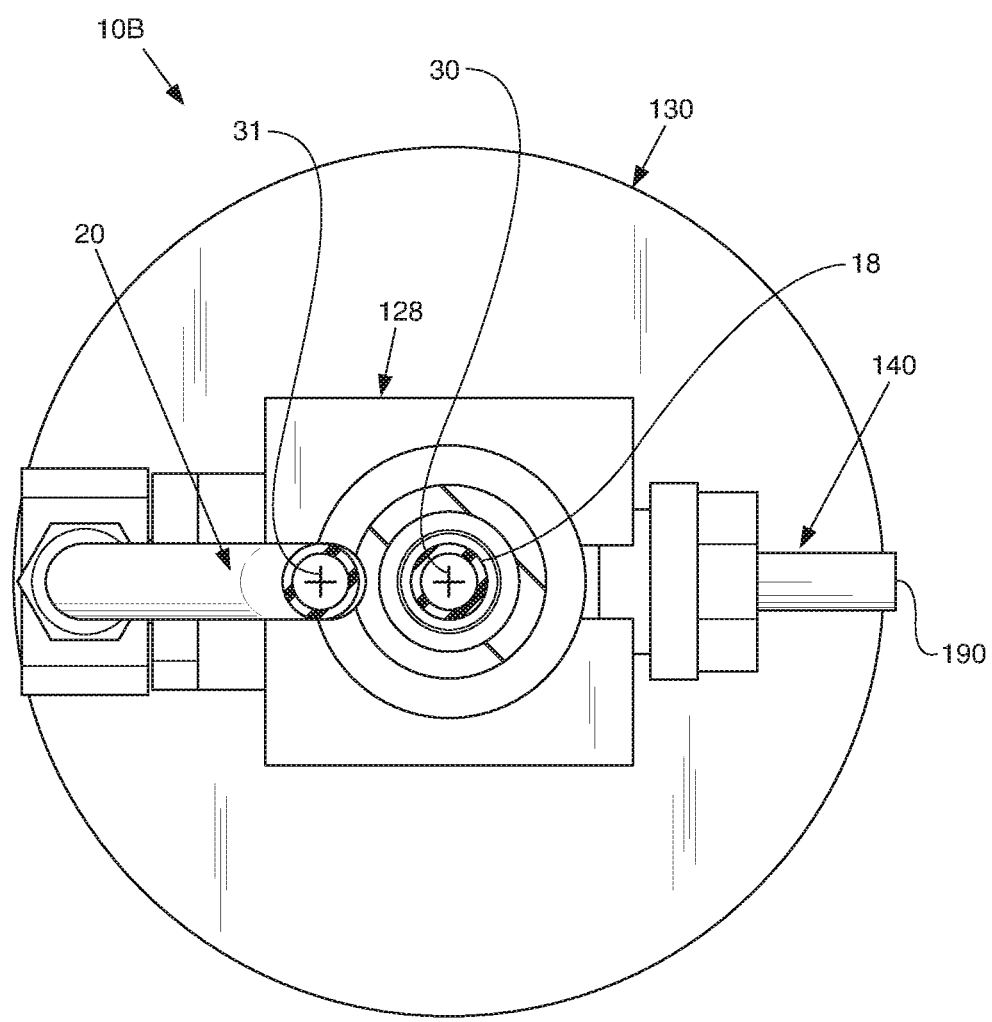
FIG. 18 is a cross-section view taken along line 18-18 in FIG. 15.

FIG. 15-FIG. 20 depict similar positions of the UHP hose 20 as it revolves around the longitudinal axis 30 while remaining outside of tubular support member 14 as indicated above with reference to FIG. 5-FIG. 10. FIG. 15 and FIG. 18 depict cutting device 10B in the first position, which also may be referred to as the neutral position or the home position. In this scenario, the cutting head 126 may be oriented in a manner such that the end 190 of extension tube 140 is aligned with a cut line 118 of pipe 26. As the UHP fluid moving through hose 20 and the abrasive fluid moving through feed line 18 mix within rigid body 128 exits the outer end 190 of extension tube 140, it is directed towards the cut line 118 and cuts the same into the first section of pipe 26A and the second section of pipe 26B to be capped and left in the ground.

Figure 16A:
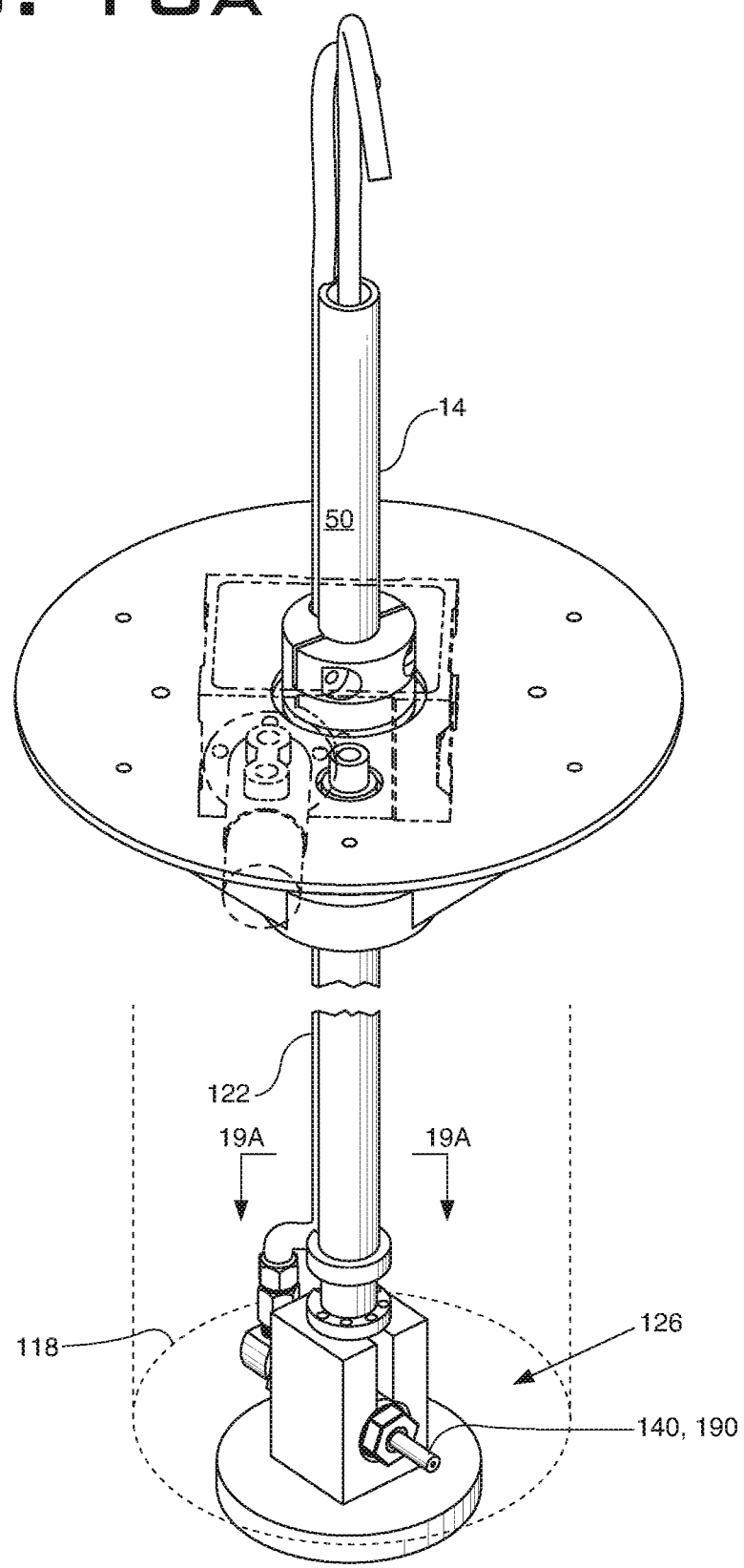
FIG. 16A is an operational perspective view of the second embodiment cutting device wherein the cutting head is rotated 180° from the first position and the high pressure hose or tube has been revolved around a longitudinal axis but remains outside an elongated tubular support member.
Figure 19A:
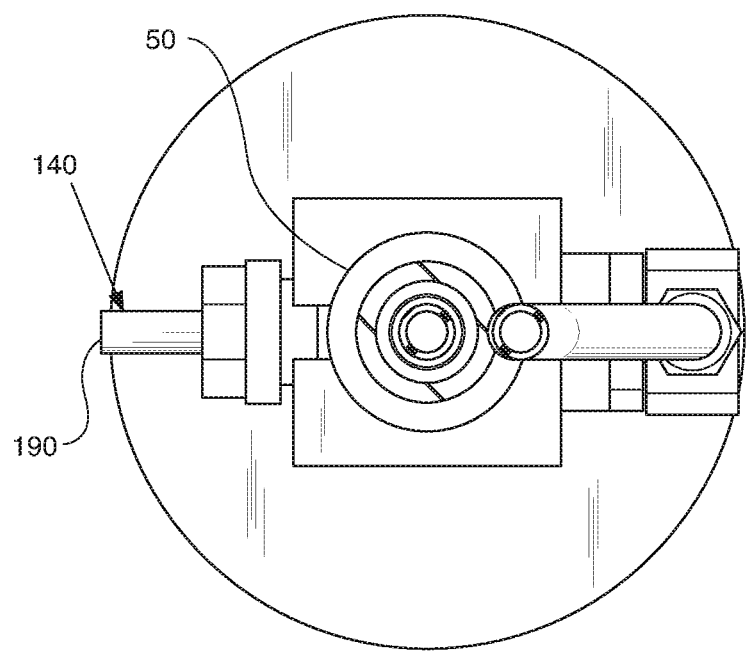
FIG. 19A is a cross-section view taken along line 19A-19A in FIG. 16A.

FIG. 16A and FIG. 19A depict the one have revolution position wherein the collar 42 effectuates the fixed relative relationship of the hose 20 and the tubular support member 14. As the tube member 14 rotates (as driven by motor 12), the hose 20 is carried by collar 42 so as to revolve around the axis 30. The motor is capable of driving the revolution from the home position to the one have revolution position. The motor may drive the revolution from the one half position to a full revolution position, or alternatively, the motor may reverse directions and drive the revolution from a one half revolution position to a reverse one have revolution position (i.e., from 180° to −180°).

Figure 16B:
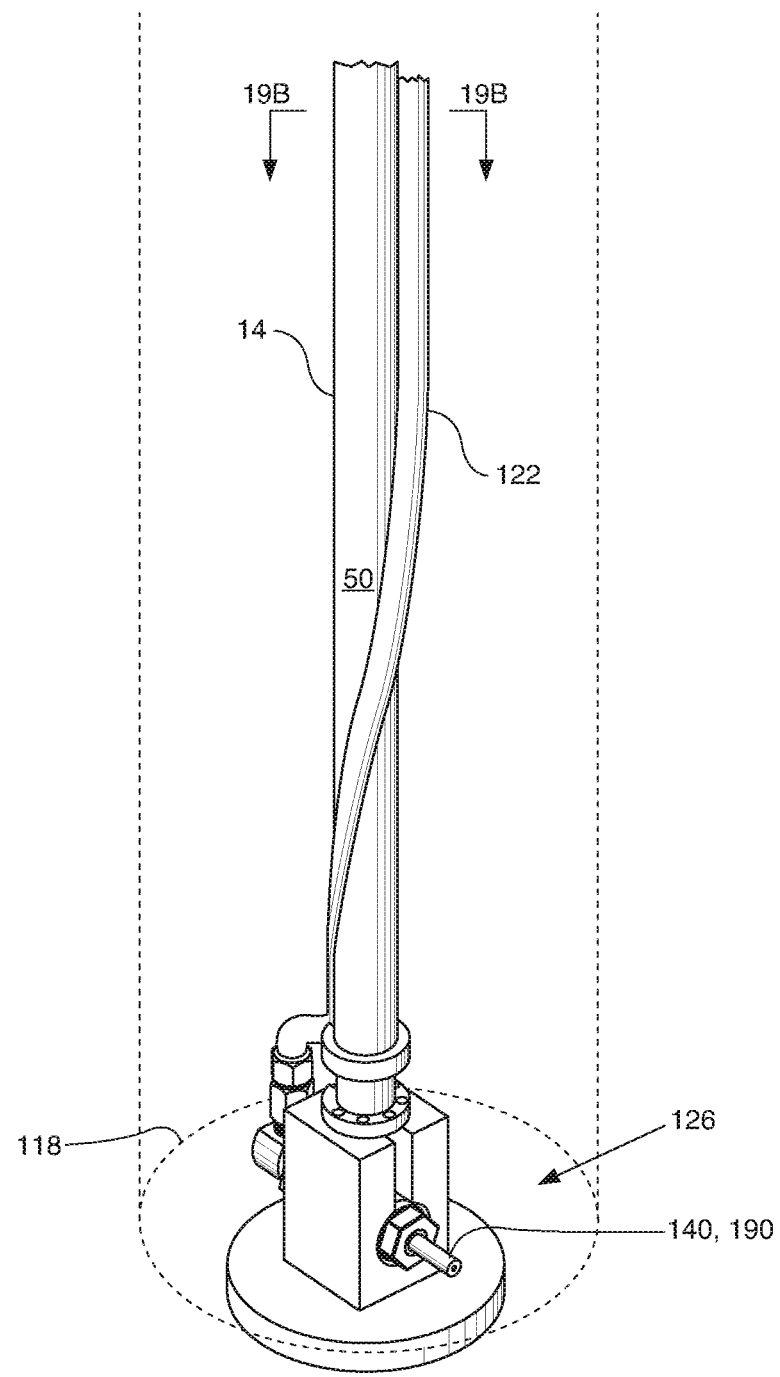
FIG. 16B is an operational perspective view of the second embodiment cutting device wherein the cutting head is rotated 180° from the first position and the high pressure hose or tube has optionally wrapped the elongated tubular support member via revolving the same around a longitudinal axis.
Figure 19B:
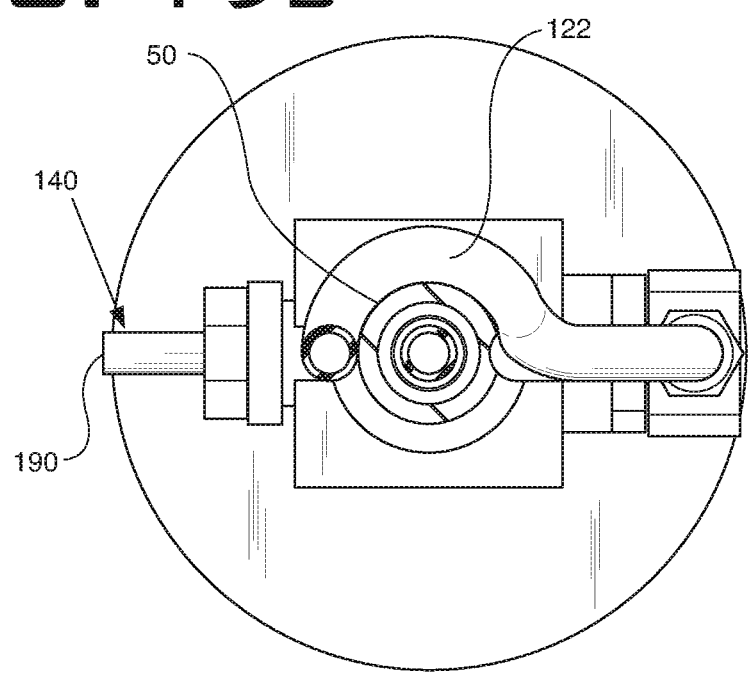
FIG. 19B is a cross-section view taken along line 19B-19B in FIG. 16B.
Figure 20A:
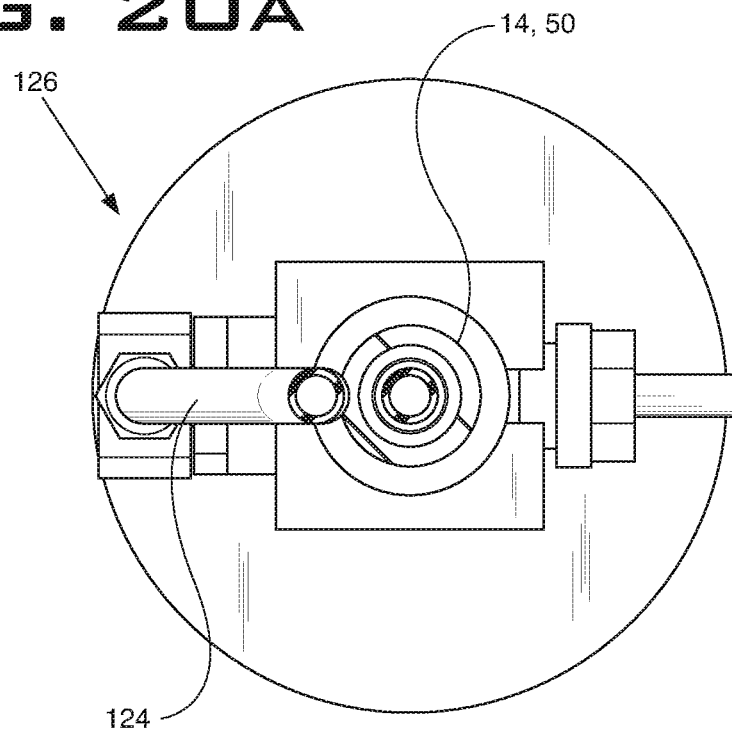
FIG. 20A is a cross-section view taken along line 20A-20A in FIG. 17A.
Figure 20B:
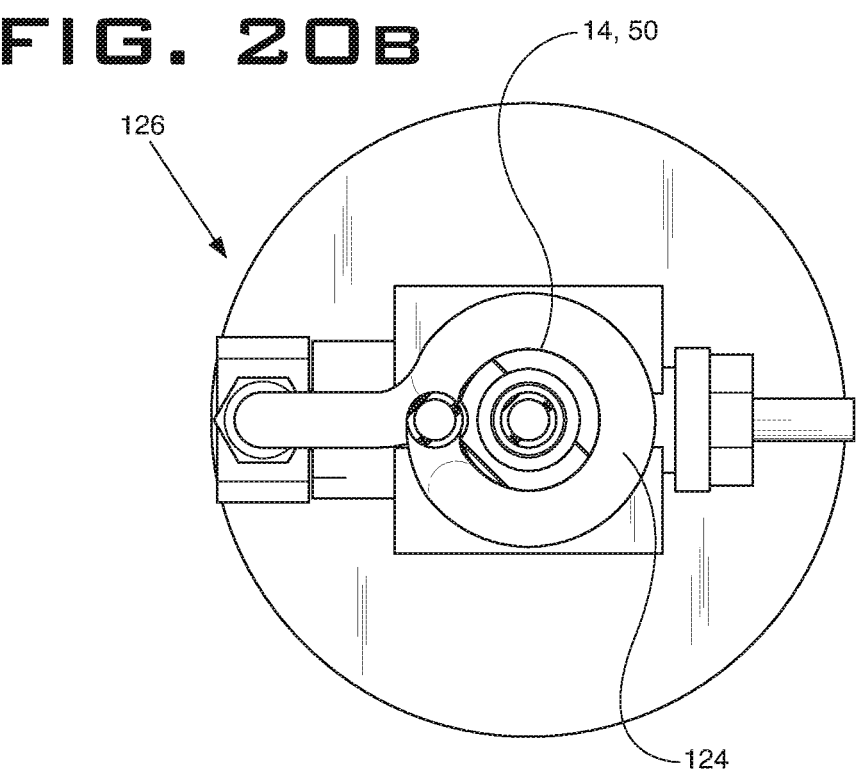
FIG. 20B is a cross-section view taken along line 20B-20B in FIG. 17B.

FIG. 16B and FIG. 19B depict the alternative version where the hose 20 is wrapped around the member 14 to accomplish to revolution of hose 20 around axis 30. More particularly, the half wrap 122 of the hose 20 makes a 180° revolution about the outer surface 50 of tubular support member 14. Motor 12 may continue to drive cutting head 126 to move it along the cut line 118 fully therearound such that, as shown in FIG. 17B and FIG. 20B, the full wrap or full revolution 124 of UHP tube is effectuated around the outer surface 50 of tubular support member 14. Thus, device 10A and 10B operate in a similar manner, but may be accomplished with different styles of cutting heads located at the lower end 46 of tubular support member 14.

Figure 21:
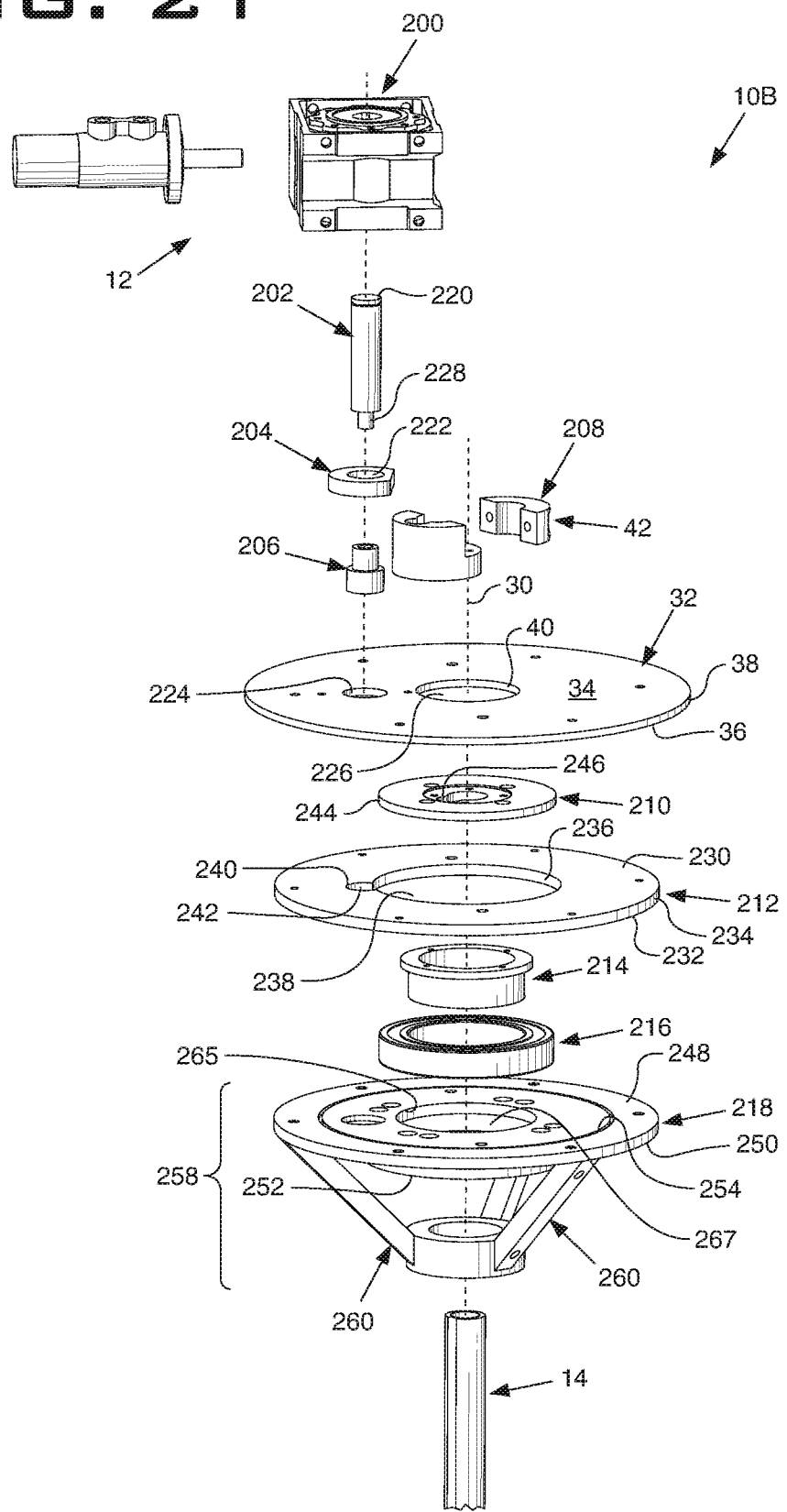
FIG. 21 is an exploded perspective view of a drive assembly and centering device on the second embodiment cutting device.
Figure 22:
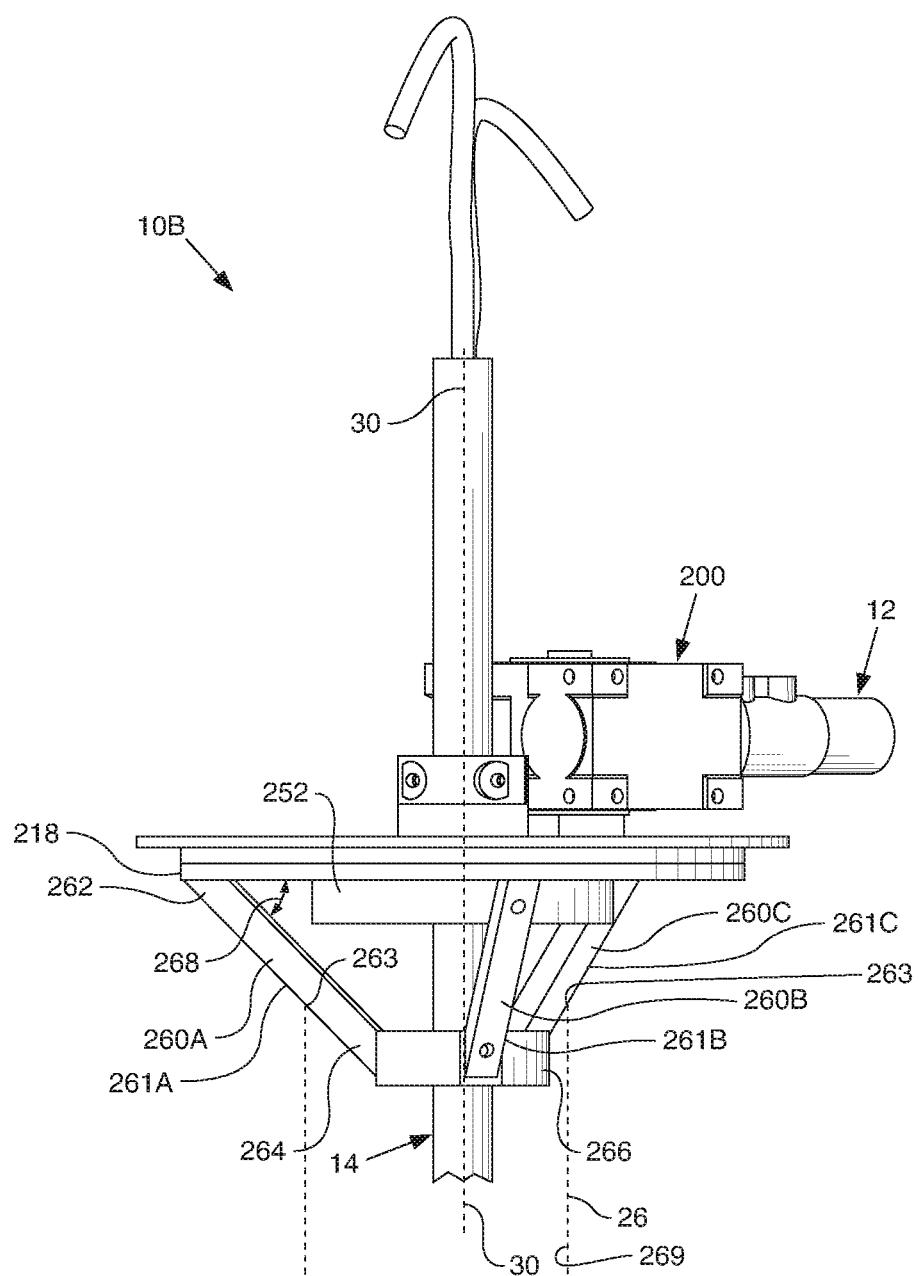
FIG. 22 is a side elevation view of the drive assembly and centering device on the second embodiment cutting device.
Figure 23:
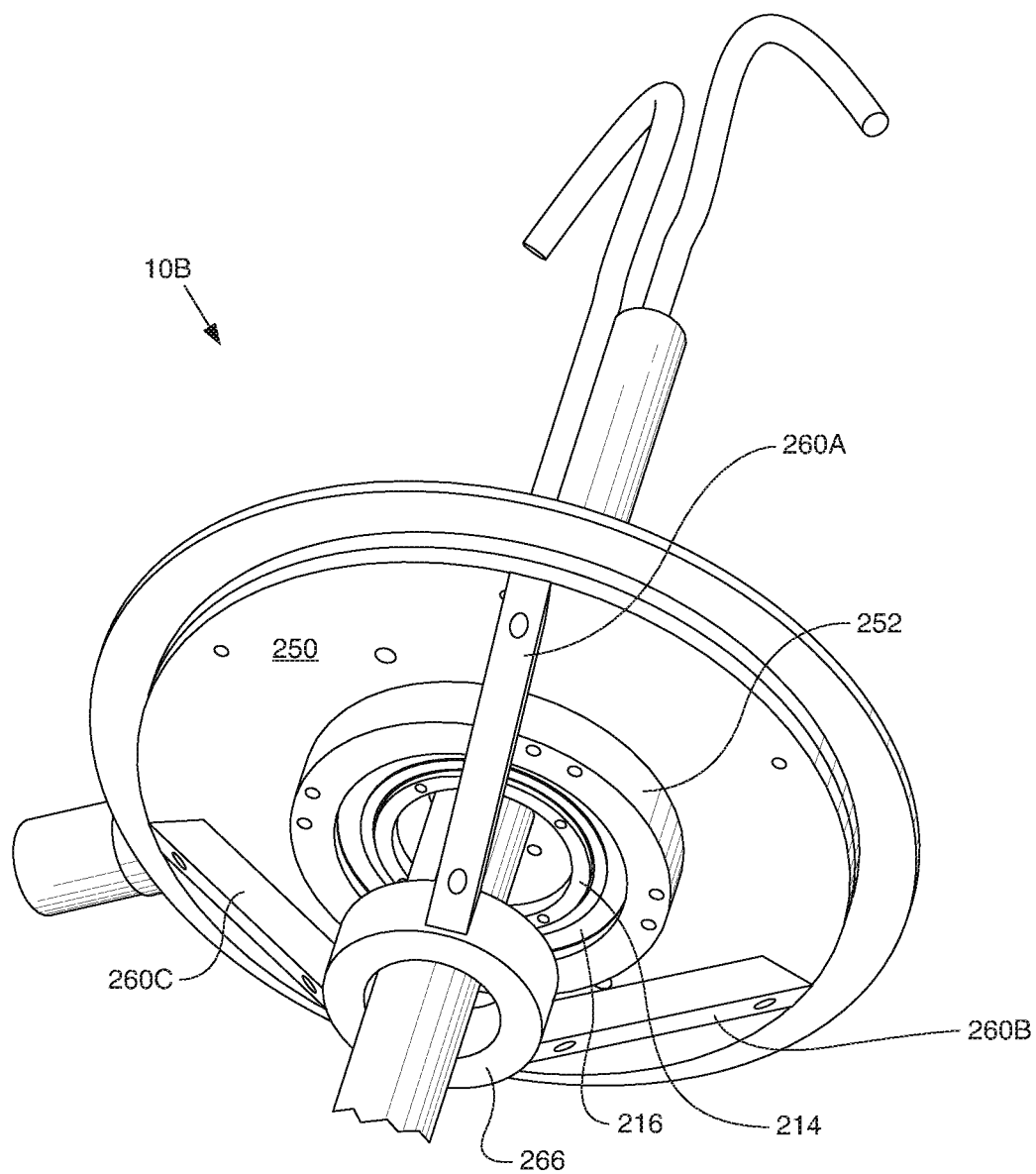
FIG. 23 is a bottom perspective view of the centering device on the second embodiment cutting device.

FIG. 21-FIG. 23 depict a drive assembly utilized to effectuate the revolution of UHP hose 20 in cutting device 10B. The drive assembly includes hydraulic motor 12, a 90° worm gear reducer 200, a reducer shaft 202, a gear reducer mount 204, a pinon gear 206, a split clamp 208 of the collar 42, the top plate 32, a spur gear 210, a middle plate 212, a hub 214, a bearing 216, and a bottom plate 218.

Shaft 202 includes an upper end 220 in operative communication with the hydraulic motor being positioned within the 90° worm gear reducer 200. Hydraulic motor 12 drives shaft 202 via worm gear reducer 200. Longitudinal axis of shaft 220 is offset parallel to longitudinal central axis 30 of device 10B. Shaft 202 extends through an aperture 222 formed in gear reducer mount 204. The gear reducer mount 204 is located above the upwardly facing top surface 34 of top plate 32 above an aperture 224 formed extending through the top surface 34 of top plate 32. Aperture 224 is offset from the inner edge 40 such that the aperture 224 is eccentric to central aperture 226 defined by inner edge 40.

Pinion gear 206 extends through aperture 224 is in direct communication with a lower end 228 of shaft 202. Pinion gear 206 rotatably mates with gear 210

Middle plate 212 is generally annular in shape and includes an upwardly facing top surface 230 and a downwardly facing bottom surface 232. Middle plate 212 further includes an outer perimeter edge 234 and an inner edge 236 defining a central aperture 238. Inner edge 236 is interrupted by an arcuate cutout 240 defining a smaller second aperture 242. Aperture 242 is sized to receive the lower end of pinion gear 206 therein. When assembled, the middle plate 212 is closely adjacent the top plate 32 such that the lower surface 236 of the top plate engages the upwardly facing top surface 230 of the middle plate 212. The central aperture 226 of top plate 32 has a smaller diameter than the central aperture 238 of middle plate 212. The spur gear 210 is positioned within the central aperture 238 of the middle plate 212.

An outer perimeter 244 of spur gear 210 is closely adjacent the lower end of pinion gear 206 residing in the cutout aperture 242. Spur gear 210 is rigidly connected to collar 42. Accordingly, when hydraulic motor 12 drives shaft 202 which rotates the pinion gear 206, the spur gear 244 is rotated about longitudinal axis 30 to effectuate the revolutional movement of the UHP hose 20 which is held in place by an eccentric edge 246 of spur gear 210 (and the collar 42). Spur gear 210 is positioned above the hub and bearing 214, 216 within the central aperture 238 of the middle plate. The hub and bearing 214, 216 effectuate movement of the spur gear 210 in response to driven movement of pinion gear 206. The hub and bearing 214, 216 are located centrally about longitudinal axis 230 and are retained within the bearing retainer 252. Lower plate 218 includes an upwardly facing top surface 248 which mateably engages the downwardly facing lower surface 232 of middle plate 212. Lower plate 218 further includes a downwardly facing bottom surface 250. The bearing retainer 252 may extend downwardly from the bottom surface 250 of lower plate 218. Bearing retainer 252 retains bearing 216 therein. Additionally, a channel 254 may be formed in upwardly facing top surface 248 configured to receive an O-ring or gasket seal.

Lower support plate 218 may also qualify as a centering device 258 in accordance with one aspect of the present disclosure. A centering device utilizing lower support plate 218 may be used with various aspects of either this disclosure or other disclosures which require a tool to be centered within a pipe 26 or within another cylindrical body. Thus, while the centering device 258 encompassed by the lower plate 218 is shown herein with respect to cutting device 10B, it is to be understood that any utility tool on the down hole end of a tubular support member could be centered within the pipe 26 utilizing the centering device 258.

Thus, centering device 258 may include plate 218 and a plurality of angled support arms 260 extending from the bottom surface 250 of plate 218. In one embodiment, the centering device 258 may utilize three support arms 260A, 260B, 260C oriented 120° apart from each other and viewed from above along the longitudinal axis. When viewed from the side, as depicted in FIG. 22, the three tapered support members 260A, 260B, 260C each includes an upper end 262 and a lower end 264. The upper end 262 is rigidly connected with the bottom surface 250 of plate 218. The lower end of 264 of support member 260 may be connected with a collar 266 which is concentric about longitudinal axis 30. In one embodiment, an angle 268 is defined between the tapered support 260 and the bottom surface 250 of bottom plate 218. The angle 268 may be in a range from about 10° to about 80°. In one particular embodiment, the angle 260 is in a range from about 45° to about 60°. In another particular embodiment, the angle 260 is 60°. The upper end 262 is positioned radially outward a further distance from longitudinal axis 30 relative to lowered end 264. Accordingly, the combination of the tapered supports 260A, 260B, 260C allow the device 10A, 10B or another utility down hole tool device to be centered within pipe 260. The tapered supports act as a centering cone to effectuate the centering of device 10A, 10B or another device relative to longitudinal axis 30.

With continued reference to FIG. 21, FIG. 22, and FIG. 23, centering device 258 is not limited to use strictly with the cutting heads 54,126. It may be used to center any type of utility tool in the pipe 26 or tube when the utility tool at least partially is inserted therein. The centering device 258 may further provide that the first member 260A include a first edge 261A angled relative to the longitudinal axis 30 of the pipe 26 or tube. The second member 260B may include a second edge 261B angled relative to the longitudinal axis 30. The third member 260C may include a third edge 261C angled relative to the longitudinal axis 30. The first and second members 260A, 260B are radially spaced from each other relative to the longitudinal axis 30. Additionally, the first and second edges 261A, 261B are angularly contact the pipe 26 or tube in a slanted alignment. In one example, the first support member 260A is spaced about 120° from the second support 260B member relative to the longitudinal axis 30.

The bottom plate 218 is rigidly connected with respective upper ends of the first, second, and third edges 261A, 261B, and 261C. The first, second, and third edges 261A, 261B, and 261C are sized to contact a portion of an upper circumferential edge 263 of the pipe 26 or tube. The lower ends 264 of support members 260A, 260B, and 260C are positioned radially outward of the inner edge 265 (FIG. 21) defining a central aperture 267 (FIG. 21) relative to the longitudinal axis 30. This enables and positions the an upper ends 262 on the first edge 261A or the first support 260A remain exterior to the pipe 26 or tube in response to revolution of a portion of the utility tool inside the pipe or tube.

With continued reference to FIG. 22 and FIG. 23, the cutting device 10B or 10A may also be referred to as a device for effecting the pipe 26 or tube when the device 10A, 10B is at least partially inserted therein. The device 10A, 10B includes the elongated support member 14 including first and second ends, wherein the support member 14 is oriented similar to the longitudinal 30 axis of the pipe or tube. A utility tool, such as cutting head 54 or 126, is coupled near the second end of the elongated support 14 adapted to be inserted into the pipe 26 or tube, and the utility tool performs a function that effects the pipe or tube (in this case cut the pipe, however other functions are entirely possible, such as clean the pipe or paint the pipe or weld the pipe). The centering device 258 is near the first end of the elongated support 14 for centering the device relative to the pipe 26 or tube. The centering device 258 includes the first edge 261A that is angled between 10° and 80° relative to the longitudinal axis 30 and the first edge 261A is adapted to contact at least a portion of an inner circumferential edge 263 of the pipe 26 or tube. The first edge 261A on the centering device includes a first end (near 262) and a second end (near 264), wherein when the centering device 258 centers the device within the pipe 26 or tube, the first end of the first edge 261A is exterior to the pipe 26 or tube and the second end of the first edge 261A is interior to the pipe 26 or tube. The second edge 261B on the centering device is spaced radially from the first edge 261A relative to the longitudinal axis 30, wherein the second edge 261B is angled between 10° and 80° relative to the longitudinal axis and the second edge is adapted to contact at least a portion of the inner circumferential edge 263 of the pipe 26 or tube, wherein the second support includes a first end and a second end, wherein when the centering device centers the device within the pipe or tube, the first end of the second edge 261B is exterior to the pipe or tube and the second end of the second edge 261B is interior to the pipe or tube. The third support 260C includes a first end and a second end, wherein when the centering device centers the device within the pipe or tube, the first end of the third edge 261C is exterior to the pipe or tube and the second end of the third edge is interior to the pipe or tube. In one particular example, the first and second supports 260A, 260B on the centering device 258 are at an angle in a range from 30° to 60° relative to the longitudinal axis 30.

The first ends 262 of the first support 260A and the second support 260B are both positioned along an imaginary circumferential curve associated with circumferential edge 263 defined by $X^2+Y^2=R^2$, wherein a R is a first radius of inner surface 269 of the pipe 26 or tube relative to the longitudinal axis 30 and a second radius of the first ends 262 of the first and second supports 260A, 260B relative to the longitudinal axis 30 is greater than the first radius so as to position the first ends 262 exterior from the inner surface 269 of the pipe 26 or tube.

In one example the motor 12 revolves UHP hose 20 or tubing around the elongated support member 14 including an outer end that is positioned radially outward from the first ends of the first support and the second supports on the centering device. However, other embodiments of the present disclosure may provide a motor that effect revolutionary movement of a portion of the utility tool while an outer end of support 14 that is positioned radially outward from the first ends 262 of the first support 260A and the second support 260B on the centering device.

As depicted in FIG. 21, FIG. 22, and FIG. 23, the centering device 258 is generally conical in shape. More particularly, the centering device 258 is shaped in an inverted frustoconical configuration.

Figure 24:
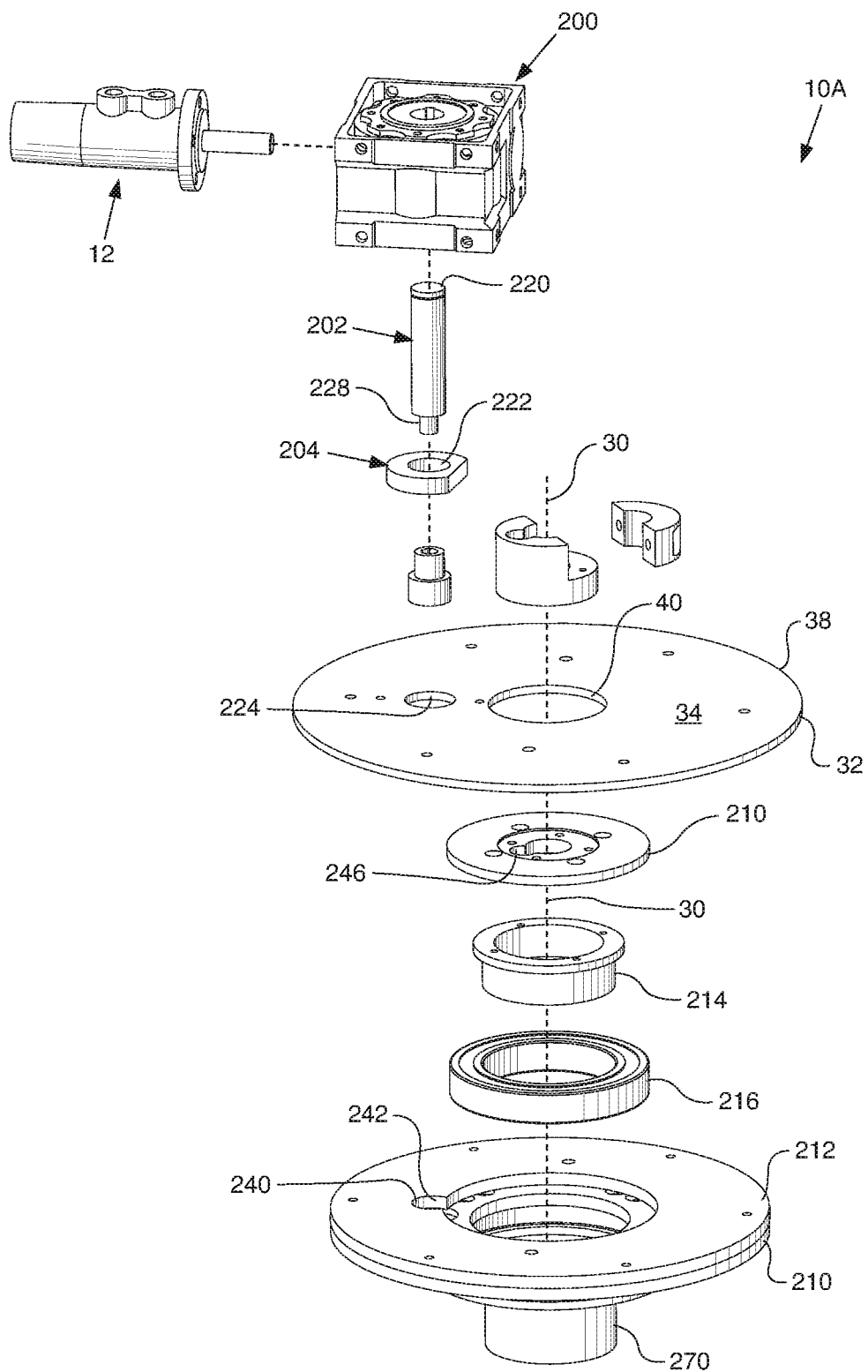
FIG. 24 is an exploded perspective view of the drive assembly on the first embodiment cutting device.
Figure 25:
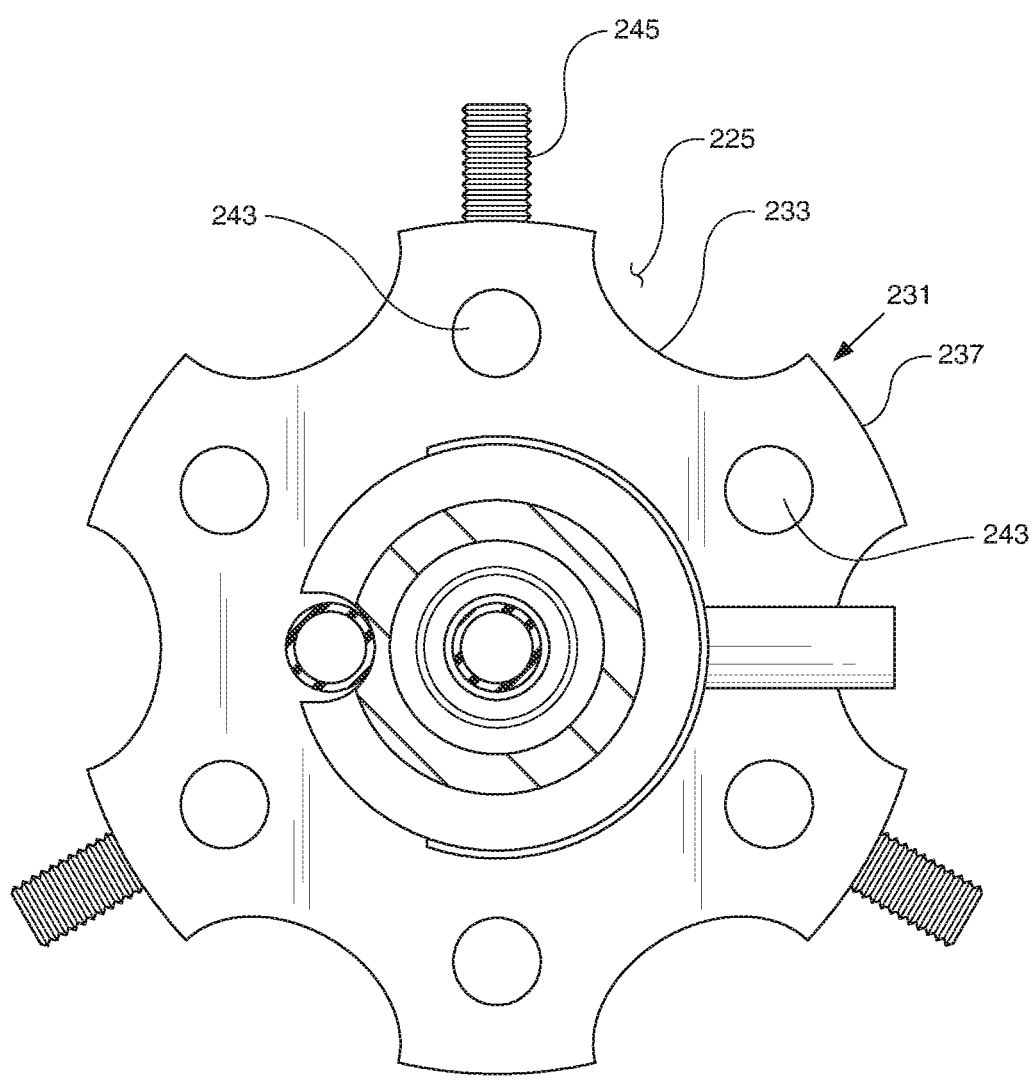
FIG. 25 is a top view of an alternative version of an annular lower plate connected to the bottom of a cutting head to center the cutting head in a pipe to be cut.

FIG. 24 represents a drive system in accordance with another aspect of the present disclosure utilized on cutting device 10A. A majority of the features of the drive system depicted in FIG. 25 are similar to those depicted in FIGS. 21-23, except that it does not have a centering device utilizing the tapered supports identified above. Rather, the centering device utilized with cutting device 10A has an annular collar or cylindrical member 270 which would have an outer diameter that is slightly less than the pipe 26 to be cut. Accordingly, the collar nests within the pipe so as to effectuate a centering of the drive device and the cutting device 10A about longitudinal axis 30. It is envisioned that the embodiment of the drive system utilizing the centering collar 270 shown in FIG. 24 is best utilized with smaller diameter pipes in a range from about four to six inches. The centering device 258 shown with respect to FIG. 21, FIG. 22, and FIG. 23 is envisioned to be best utilized on pipes having a diameter larger than about six inches.

FIG. 25 depicts and alternative annular plate 231 which is connected to the cutting head so as to center the same when the cutting head is located within a pipe 26 to be cut. Plate 231 include one or more edges 233 that define cutout regions 235 that interrupt the perimeter 237 of plate 231. Plate 231 may further define longitudinally extending holes 243 extending fully through plate 231. Together, the cutout regions 235 and holes 243 form passageways for fluid and debris to pass through when the cutting device 10A or 10B is in its operational mode. The passage of debris through the passageways enables the high pressure fluid that cuts pipe 26 to flow way from the cutting head to prevent clogging. Plate 231 may further include adjusting screws 245 spaced in intervals around the plate 231, specifically around the perimeter 237. The screws 245 may be manually adjusted to contact the inner surface of pipe 26 so as to center the plate 231 relative to the pipe.

Figure 26:
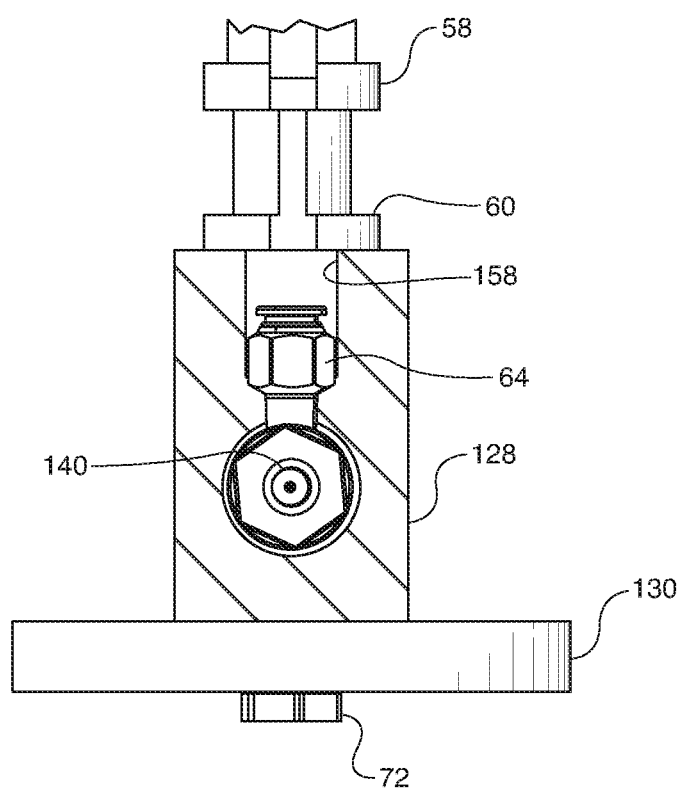
FIG. 26 is a side elevation of a cutting head assembly depicting a portion of a central abrasive feed line coupler slidably received within a slot.
Figure 27:
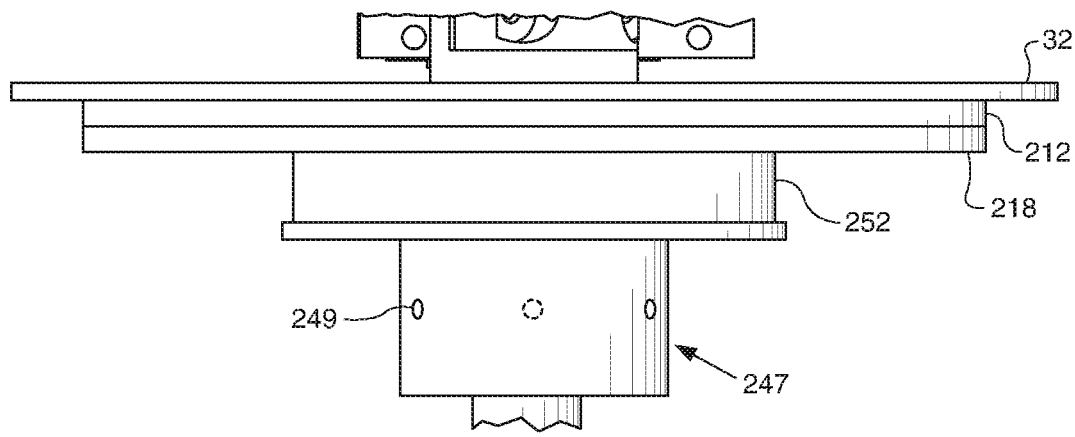
FIG. 27 is an enlarged side elevation view of a centering device in the shape of a collar configured to center the device in smaller diameter pipes to be cut.

FIG. 26 is a side elevation view of cutting head 126 depicting that coupler 64 has a smaller diameter than slot 158 so as to enable the coupler 64 to slide into and out of the slot 158. FIG. 27 depicts a centering collar 247 extending downwardly from bearing retainer 252. Centering collar 247 may substitute the centering device 258 form FIG. 21 when smaller diameter pipes need to be cut. For example, when a 4" pipe needs to be cut, the centering collar 247 may be inserted into the pipe to center the cutting assembly therein. Accordingly, centering collar 247 may have an outer diameter that is slightly less than or equal to about four inches to enable the same to slide within a four inch inner diameter pipe. The centering collar 247 defines radially extending holes 249. The radial holes 249 are design to receive centering screws therethrough (similar to set screws 245). When the device needs to cut a pipe with a smaller diameter, such as an outer diameter of two inches, the centering collar 247 may be slipped over the outside of the tube to be cut. Then, centering screws may be threaded through holes 249 to center the cutting assembly inside the pipe to be cut by screws contacting the outer surface of the pipe when the centering collar 247 is positioned radially exterior therefrom.

Additionally, other embodiments of the cutting heads 54,126 are to be fabricated in a manner that includes at least two focus tubes for directing the mixture of UHP fluid and abrasive towards the inner surface of the pipe to be cut. For example, the cutting heads 54,126 could each have two focus tubes rotatable at least 180° in opposite directions at the same or near the same time. This could effective reduce the cutting time for the machine in half (as opposed to a single focus tube performing a complete 360° turn.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method for effecting a pipe or tube comprising:
    inserting an elongated support member including first and second ends into a pipe or tube and a central longitudinal axis;
    centering the utility tool along the central longitudinal axis with a centering device that is at least partially disposed exterior to the pipe or tube; and
    moving a utility tool that is coupled near the second end of the elongated support relative to the pipe or tube wherein the utility tool is adapted to perform a function that effects the pipe or the tube.

2. The method of claim 1, wherein centering the utility tool is accomplished by centering the elongated support within the pipe or tube along the central longitudinal axis with the centering device that includes a first edge that is angled between 10 degrees and 80 degrees relative to the central longitudinal axis of the elongated support member.

3. The method of claim 2, further comprising:
    contacting a first edge of the centering device with at least a portion of an circumferential edge of the pipe or tube.

4. The method of claim 3, wherein the first edge of the centering device includes a first end and a second end, further comprising:
    disposing the first end of the first edge of the centering device exterior to the pipe or tube; and
    disposing the second end of the first edge of the centering device interior to the pipe or tube.

5. The method of claim 3, further comprising:
    contacting a second edge on the centering device that is spaced radially from the first edge relative to the central longitudinal axis with the circumferential edge of the pipe or tube, wherein the second edge is angled between 10° and 80° relative to the central longitudinal axis.

6. The method of claim 5, wherein the second edge of the centering device includes a first end and a second end, further comprising:
    disposing the first end of the second edge of the centering device exterior to the pipe or tube; and
    disposing the second end of the second edge of the centering device interior to the pipe or tube.

7. The method of claim 5, further comprising:
    contacting a third edge on the centering device that is spaced radially from the first edge and the second edge relative to the central longitudinal axis with the circumferential edge of the pipe or tube, wherein the third edge is angled between 10° and 80° relative to the central longitudinal.

8. The method of claim 7, wherein the third edge of the centering device includes a first end and a second end, further comprising:

disposing the first end of the third edge of the centering device exterior to the pipe or tube; and disposing the second end of the third edge of the centering device interior to the pipe or tube.

9. The method of claim 7, wherein the first edge, the second edge, and the third edge on the centering device are each at an angle in a range from about 30° to about 60° relative to the central longitudinal axis.

10. The method of claim 7, further comprising:

positioning respective ends of the first edge, the second edge, and the third edge along an imaginary circumferential curve defined by $X^2+Y^2=R^2$, wherein a R is a radius of the respective ends of the first edge, the second edge, and the third edge relative to the central longitudinal axis.

11. The method of claim 1, further comprising:

powering a motor to move the utility tool, wherein the motor is located exterior to the pipe or tube.

12. The method of claim 11, further comprising:

positioning the motor radially outward from the centering device relative to the central longitudinal axis.

13. The method of claim 1, further comprising:

revolving a hose around the central longitudinal axis exterior to the elongated support and interior the pipe or tube.

14. The method of claim 1, further comprising:

after inserting the elongated support member into the pipe or tube, positioning a plate exterior the pipe or tube that supports at least a portion of the centering device.

15. The method of claim 14, further comprising:

after inserting the elongated support member into the pipe or tube, positioning an annular collar interior the pipe or tube that supports at least a portion of the centering device.

16. The method of claim 15, wherein the collar is positioned around the elongated support member and is concentric therewith about the central longitudinal axis.

17. The method of claim 1, further comprising:

contacting a first edge of the centering device with an inner circumferential edge of the pipe or tube.

18. The method of claim 1, wherein the pipe or tube is a portion of casing from an in-ground wellbore.

19. The method of claim 1, wherein the casing is vertically disposed within ground, further comprising:

cutting the casing with the utility tool;

extracting the cut casing from the ground;

capping a remaining portion of the casing to seal the wellbore; and covering the capped remaining portion of the casing with ground material.

20. A method for effecting a pipe or tube comprising:

inserting an elongated support member including first and second ends into a pipe or tube and a central longitudinal axis;

centering the utility tool along the central longitudinal axis with a centering device that is at least partially disposed exterior to the pipe or tube; and moving a utility tool that is coupled near the second end of the elongated support relative to the pipe or tube wherein the utility tool is adapted to perform a function that effects the pipe or the tube;

wherein centering the utility tool is accomplished by centering the elongated support within the pipe or tube along the central longitudinal axis with the centering device that includes a first edge that is angled between 10 degrees and 80 degrees relative to the central longitudinal axis of the elongated support member.

21. A method for effecting a pipe or tube comprising:

inserting an elongated support member including first and second ends into a pipe or tube and a central longitudinal axis;

centering the utility tool along the central longitudinal axis with a centering device that is at least partially disposed exterior to the pipe or tube;

moving a utility tool that is coupled near the second end of the elongated support relative to the pipe or tube wherein the utility tool is adapted to perform a function that effects the pipe or the tube;

powering a motor to move the utility tool, wherein the motor is located exterior to the pipe or tube; and positioning the motor radially outward from the centering device relative to the central longitudinal axis.

22. A method for effecting a pipe or tube comprising:

inserting an elongated support member including first and second ends into a pipe or tube and a central longitudinal axis;

centering the utility tool along the central longitudinal axis with a centering device that is at least partially disposed exterior to the pipe or tube;

moving a utility tool that is coupled near the second end of the elongated support relative to the pipe or tube wherein the utility tool is adapted to perform a function that effects the pipe or the tube; and revolving a hose around the central longitudinal axis exterior to the elongated support and interior the pipe or tube.

23. A method for effecting a pipe or tube comprising:

inserting an elongated support member including first and second ends into a pipe or tube and a central longitudinal axis;

centering the utility tool along the central longitudinal axis with a centering device that is at least partially disposed exterior to the pipe or tube;

moving a utility tool that is coupled near the second end of the elongated support relative to the pipe or tube wherein the utility tool is adapted to perform a function that effects the pipe or the tube; and after inserting the elongated support member into the pipe or tube, positioning a plate exterior the pipe or tube that supports at least a portion of the centering device.

* * * * *